US007080031B2

(12) United States Patent
Crowe et al.

(10) Patent No.: US 7,080,031 B2
(45) Date of Patent: Jul. 18, 2006

(54) SYSTEM AND METHOD FOR DETERMINING AN EVOLVING COMBINATION OF NETWORK COMPONENTS TO MAXIMIZE THE NET PRESENT VALUE OF A PROVIDER'S CASH FLOW

(75) Inventors: James Q. Crowe, Denver, CO (US); Russell A Rushmeier, Mount Kisco, NY (US); Indraneel Das, East Hartford, CT (US); Paul J. Koster, Broomfield, CO (US); Jose F. Alvarez, Denver, CO (US); Mark A. Reynolds, Superior, CO (US); Lorraine Lotosky, Longmont, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 661 days.

(21) Appl. No.: 10/060,412

(22) Filed: Feb. 1, 2002

(65) Prior Publication Data
US 2003/0046127 A1    Mar. 6, 2003

Related U.S. Application Data

(60) Provisional application No. 60/265,327, filed on Feb. 1, 2001, provisional application No. 60/301,790, filed on Jul. 2, 2001.

(51) Int. Cl.
*G06F 17/60* (2006.01)

(52) U.S. Cl. .............................. 705/35; 705/42; 705/43; 705/53; 370/352; 370/404; 370/462; 370/463; 370/468; 370/471; 455/453

(58) Field of Classification Search ................. 705/35, 705/42, 43, 53; 370/352, 404, 462, 463, 370/468, 471; 455/453
See application file for complete search history.

(56) References Cited

U.S. PATENT DOCUMENTS

| | | | | |
|---|---|---|---|---|
| 5,175,800 | A | 12/1992 | Galis et al. | 395/51 |
| 5,274,643 | A * | 12/1993 | Fisk | 370/238 |

(Continued)

OTHER PUBLICATIONS

PCT International Search Report for PCT/US02/02863.

(Continued)

*Primary Examiner*—James Reagan
*Assistant Examiner*—Charlie Lion Agwumezie
(74) *Attorney, Agent, or Firm*—Faegre & Benson LLP

(57) ABSTRACT

A method and computer program product are presented for selecting and arranging an appropriate combination of network components, or elements, in a communications network. The selection of network components is done in a manner that maximizes the net present value of cash flow resulting from the provision of communications services between nodes of the network. The method comprises the steps of receiving information that constrains network design and price establishment, and then using the constraint information to select a combination of network components for each link in the communications network. According to the invention, the selection of network components is performed for each of several successive time periods, effectively planning the evolution of the network. The selections are made so that the network components satisfy demand over time while maximizing the net present value of the cash flow that results from the provision of communications services.

44 Claims, 14 Drawing Sheets

U.S. PATENT DOCUMENTS

| | | | |
|---|---|---|---|
| 5,341,477 A | 8/1994 | Pitkin et al. | 395/200 |
| 5,844,886 A * | 12/1998 | Szentesi | 370/230 |
| 6,069,894 A * | 5/2000 | Holender et al. | 370/397 |
| 6,301,267 B1 | 10/2001 | Ben-Ami | 370/468 |
| 6,363,411 B1 | 3/2002 | Dugan et al. | 709/202 |
| 6,456,407 B1 * | 9/2002 | Tammela et al. | 398/59 |
| 2002/0052807 A1 | 5/2002 | Han et al. | |
| 2002/0072956 A1 | 6/2002 | Willems et al. | |

OTHER PUBLICATIONS

"Sycamore Networks Intelligent Optical Gear enables Utfors To Build New Data Network" Sycamore Networks Press Release, Feb. 14, 2000, [retrieved on Jun. 15, 2002]. Retrieved from the Internet: <www.sycamore.com/corporate/news/>.

* cited by examiner

SYSTEM AND METHOD FOR DETERMINING AN EVOLVING COMBINATION OF NETWORK COMPONENTS TO MAXIMIZE THE NET PRESENT VALUE OF A PROVIDER'S CASH FLOW

CROSS-REFERENCE TO RELATED APPLICATIONS

The present patent application claims priority to U.S. Patent Application No. 60/265,327 (filed Feb. 1, 2001) and No. 60/301,790 (filed Jul. 2, 2001), both of which are incorporated herein by reference in their entirety.

BACKGROUND OF THE INVENTION

1. Field of the Invention

The present invention relates to the evolution of a communications network, and more particularly to the management of associated costs and revenue.

2. Background Art

A goal of any commercial communications service provider is to maximize returns to the investors of the company. Corporate finance theory holds that the metric which best correlates with this goal is the net present value (NPV) of the stream of expected future positive and negative cash flows generated by the company's operations. Hence, an objective of the service provider is to maximize the net present value of cash flows. Communications companies and other businesses have traditionally sought to model the pursuit of this objective in the form of a strategic plan developed by their corporate development, strategic planning, or marketing divisions.

For communications companies, typical inputs to strategic planning models include revenue, capital costs, and operating costs. Assuming that the service capacity provided by a company is sufficient to meet demand, the first of these inputs, revenue, is generally treated as being independent from costs. Moreover, if the level of demand (a factor in determining revenue) is assumed to be related to cost in any way, it is generally done for the purpose of short term pricing and competitive analysis. Hence the relationship between revenue and cost has not been fully appreciated in the development of strategic planning models. In particular, the failure to consider the interaction between price, demand, and cost has led to the development of business plans that are suboptimal.

Hence there is a need for a practical business model which recognizes the connection between price, demand, and cost. The technologies underlying the communications industry are now enabling exponential improvements in performance per dollar expended. Without such a business model, a communications company will almost certainly be unable to make sensible decisions regarding the necessary price adjustments, adjustments that may have to be made on a continuous basis. A communications company lacking such a model will also be unable to intelligently deploy the improved network technologies that lower cost and stimulate demand.

BRIEF SUMMARY OF THE INVENTION

The present invention is a method and computer program product for selecting and arranging an appropriate combination of network components, or elements, in a communications network and establishing prices for communications services. This is done in a manner that maximizes the net present value of cash flow resulting from the provision of communications services between nodes of the network. The method comprises the steps of receiving information that constrains network design and price establishment, and then using the constraint information to select a combination of network components for each link in the communications network and to determine prices.

According to the invention, the determination of prices and selection of network components are performed for each of several successive time periods, effectively planning the evolution of the network and the price structure of communications services. The selections are made with the objective of maximizing the net present value of the cash flow that results from the sale of communications services over time, while ensuring that the network components satisfy service demand.

The invention has the feature of optimizing the net present value of cash flow from the provision of communications services. The invention has the additional feature of performing the optimization while constrained by resource and technological limitations. The invention has the advantage of incorporating demand, price, and costs into a single business model. The invention has the further advantage of yielding an extended plan for network management and product pricing.

The foregoing and other features and advantages of the invention will be apparent from the following, more particular description of a preferred embodiment of the invention, as illustrated in the accompanying drawings.

BRIEF DESCRIPTION OF THE DRAWINGS/FIGURES

DETAILED DESCRIPTION OF THE INVENTION

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

TABLE OF CONTENTS

I. Overview
  A. Purpose
  B. Process structure
  C. Basic flow
  D. Terms

II. Preliminary Assumptions
  A. Time
  B. Products

III. Process
  A. Constraints
  B. Model revenue
  C. Model network topology
    1. Nodes/rings/circles/links concept
    2. Demand
    3. Capacity
  D. Model costs
    1. Technologies
    2. Investment costs
    3. Operation costs
    4. Retirement costs
    5. Access costs
    6. Formulation
  E. Optimize
    1. General
      a. Free and derived variables
      b. Objective function
      c. Process
    2. Price profile heuristic IV. Computing Environment V. Conclusion

I. Overview

A. Purpose

The purpose of the invention is to facilitate (1) development of a communications network over time and (2) the establishment of prices, over time, of communications services (known hereinafter as "products"). Network development and pricing are performed in a manner that maximizes the net present value (NPV) of the cash flow that results from the sale of these services. The invention includes a mathematical model that describes cash flow as a function of revenue and costs.

B. Process Structure

Figure 1:
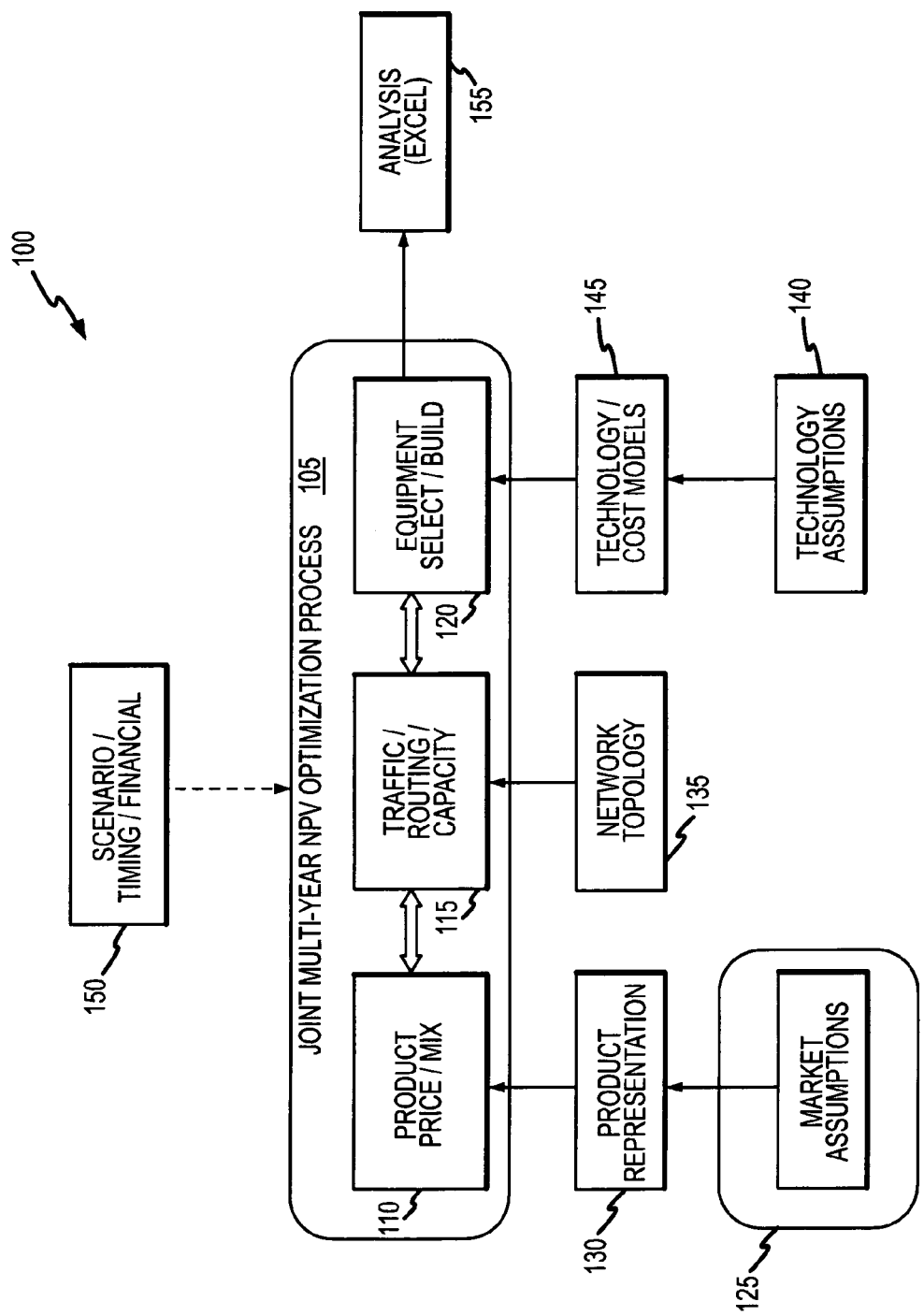
FIG. 1 is a block diagram illustrating the general process of the invention and its inputs and outputs, according to an embodiment of the invention.

The invention described herein includes an optimization process for maximizing the NPV of a cash flow, where the cash flow results from the provision of communications services. The process and the information required by the process is illustrated generally in FIG. 1. Optimization process 105 requires information inputs and produces a business plan that addresses network development and product pricing over an interval of time. Process 105 effectively integrates three general areas of analysis. First, process 105 considers the products that can be made available to customers, the price to be charged for the products, and the appropriate mix of products. This information is illustrated collectively as product and price information 110. Second, process 105 also needs to consider the amount of traffic that will be passed on the network, how the traffic will be routed, and the capacity requirements of each link of the network. This information is illustrated collectively as traffic information 115. Third, process 105 must consider the equipment and other infrastructure that must be selected and combined to provide the appropriate amount of capacity on the appropriate links, to provide the desired products to customers. This information is illustrated collectively as equipment information 120.

Process 105 uses a set of market assumptions 125. These assumptions will be described in greater detail below. In general, market assumptions 125 address demand for a product and its price, and the relationship between changes in price and changes in demand. This relationship is described in terms of a price elasticity statistic. Market assumptions 125 also include information on how demand is allocated on different links throughout the network. Initial demand levels are assumed, as are initial price levels.

In addition, the products available to customers are modeled in a product representation 130. For an optical network, such products can include, for example, private line products, internet protocol (IP)-based products, and wavelength-based products. The product representations 130, along with market assumptions 125, are used in determining the products to be provided and their pricing, in light of demand. Product representations 130 and market assumptions 125 are therefore included in product and price information 110. Product and price information 110, in turn, affects the modeling of expected revenue.

The topology of the network must also be modeled. In general, a network topology 135 includes a set of nodes for the network, a set of links (physical network segments), and organization of links into rings, where each ring is a set of links that share a common technology. Rings and circles will be described in greater detail below. Network topology 135 also includes a set of circles, where a circle is defined as a set of links that appears in one or more rings in the network. Network topology 135 is a function of routing demand and must reflect the required capacity at each link. Network topology 135 is therefore incorporated in traffic information 115.

Equipment information 120 includes a set of technology assumptions 140. Technology assumptions 140 can include the range of possible transmission rates and, in the case of an optical fiber network, the possible numbers of wavelengths that can be made available on a link. In the case of an optical fiber network, technology assumptions 140 can also include the generations of the available fiber, and the available cable sizes, i.e., fibers per cable.

The costs associated with different technologies can also be modeled. The total costs which must be paid by a communications service provider include investment costs, network services costs, operating costs, retirement costs, and access costs. Such aggregate cost models 145, along with technology assumptions 140, are incorporated in equipment information 120 to facilitate identification of what equipment to employ in the communications network, i.e., how to select components and build the network. Equipment information 120 is used in determination of the costs that can be incurred over time by the communications service provider.

Another input to the optimization process 105 is a set of assumptions regarding the overall scenario to be modeled. These scenario assumptions 150 include both timing and financial assumptions. Timing assumptions include, for example, the definition of the interval for which the optimization is being performed. In an embodiment of the invention, the optimization process addresses network development throughout a time interval starting with a defined year and proceeding through a fixed number of years. The financial assumptions can include information such as discount rate and the price compression rate needed by the optimization process 105.

The output of process 105 is a description of how a network should be deployed (e.g., what equipment should be placed at what nodes and links so as to provide the demanded products) and the pricing of the products. The appropriate product prices and equipment deployments are identified for each year in the time interval specified by scenario assumptions 150. The results can be subject to further analysis 155. In an embodiment of the invention, the results can be displayed and analyzed using a commercially available spreadsheet package, such as EXCEL, a product of MICROSOFT, Inc. of Redmond, Wash.

C. Process Flow

Figure 2:
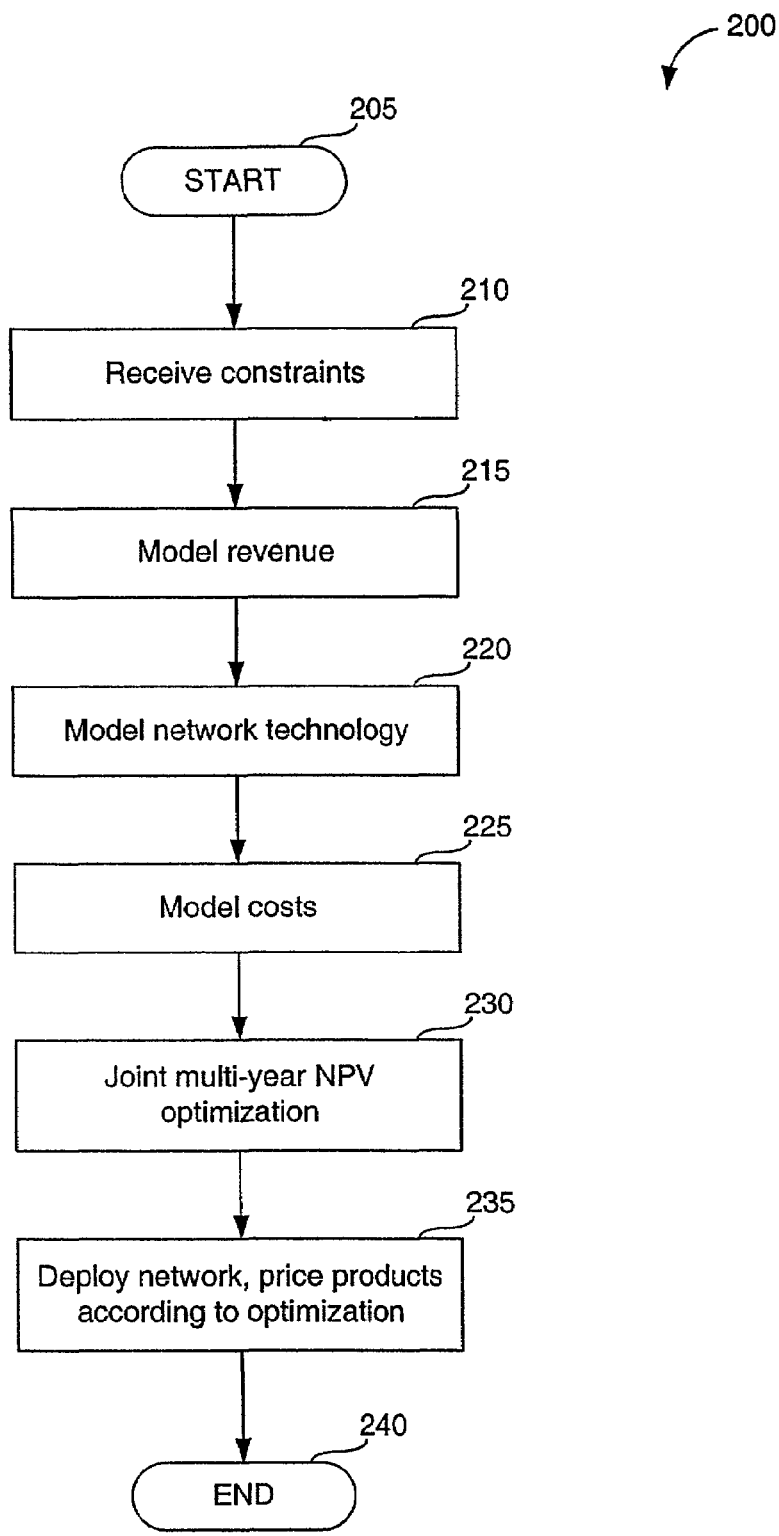
FIG. 2 is a flowchart illustrating the fundamental stages of the invention, according to an embodiment of the invention.

The overall flow of the invention is illustrated in FIG. 2. The process begins at step 205. In step 210, a variety of constraints are received. The constraints include a definition of the time interval which is addressed by the optimization, initial values for price and demand for each product, the set of nodes to be serviced by the network, and a set of financial assumptions. These include the discount rate and the constraints on the behavior of prices and costs. The constraints will be described in greater detail below. In step 215, the revenue received by the communications service provider is modeled. The revenue for each time period is modeled on the basis of price and demand in the time period. In step 220, the topology of the network is modeled. The topology model is based on demand, which determines the locations of nodes and links, and determines the required capacity per link and time period. In step 225, the various costs for which the communications service provider is responsible are modeled. Costs depend on the level of demand in each time period, and the infrastructure (equipment and bandwidth) that is bought, used, and retired in each time period. In step 230, the multi-year NPV optimization is performed. This step seeks the demand level (and, therefore, price level) for each product and time period, and the specific infrastructure deployment per link and time period, that yield the best NPV of the cash flow. In step 235, the network infrastructure is deployed and products are priced according to the optimization. The process concludes at step 240.

D. Terms

The following terms are used throughout the rest of the application. Their definitions are provided here.

Circle: A set of links (defined below) that appears in one or more rings (defined below) of a network. A circle is the physical infrastructure that supports a ring.

Cloud resources: Resources that are used by products inside a communications backbone and are shared among different products. Examples include fiber, wavelengths, and rings (defined below).

Cost compression: The rate at which costs change, per time period.

Edge resources: Resources that are used by products outside a communications backbone and are associated with specific products. Examples include routers and digital-analog cross connect systems (DACS).

Link: A chain of physical network segments.

O & M: Operation and maintenance.

Operational interval: The interval of time addressed by the optimization.

Price elasticity: The ratio of the percentage change in demand to the corresponding percentage change in price.

Ring: A set of links that share a common technology, a common number of wavelengths, and a common fiber cable. A ring represents an establishment of capability or capacity.

II. Preliminary Assumptions

The following section describes some of the assumptions that can be made prior to beginning the process of the invention. These assumptions concern modeling of the time interval addressed by the optimization, and the allocation of resources to the formation of products.

A. Time

The invention describes how the network infrastructure should evolve so as to maximize the NPV of cash flow over a defined interval of time. For analytic purposes, the interval is viewed as a series of consecutive time periods. In a preferred embodiment of the invention, each time period is one year. In alternative embodiments of the invention, the time periods can be months, quarters (i.e., three month periods), or some other defined length of time. In the notation used herein, any given year is designated by a T with an appropriate subscript. The network becomes operational at period $T_{OPER}$. The network's operational time interval of interest in defined by the sequence of periods Operational=$\{T_{OPER}, \ldots, T_{LAST}\}$. The planning horizon is defined as the sequence Planning=$\{T_{OPER}-1, \ldots, T_{LAST}\}$.

B. Products

Figure 3:
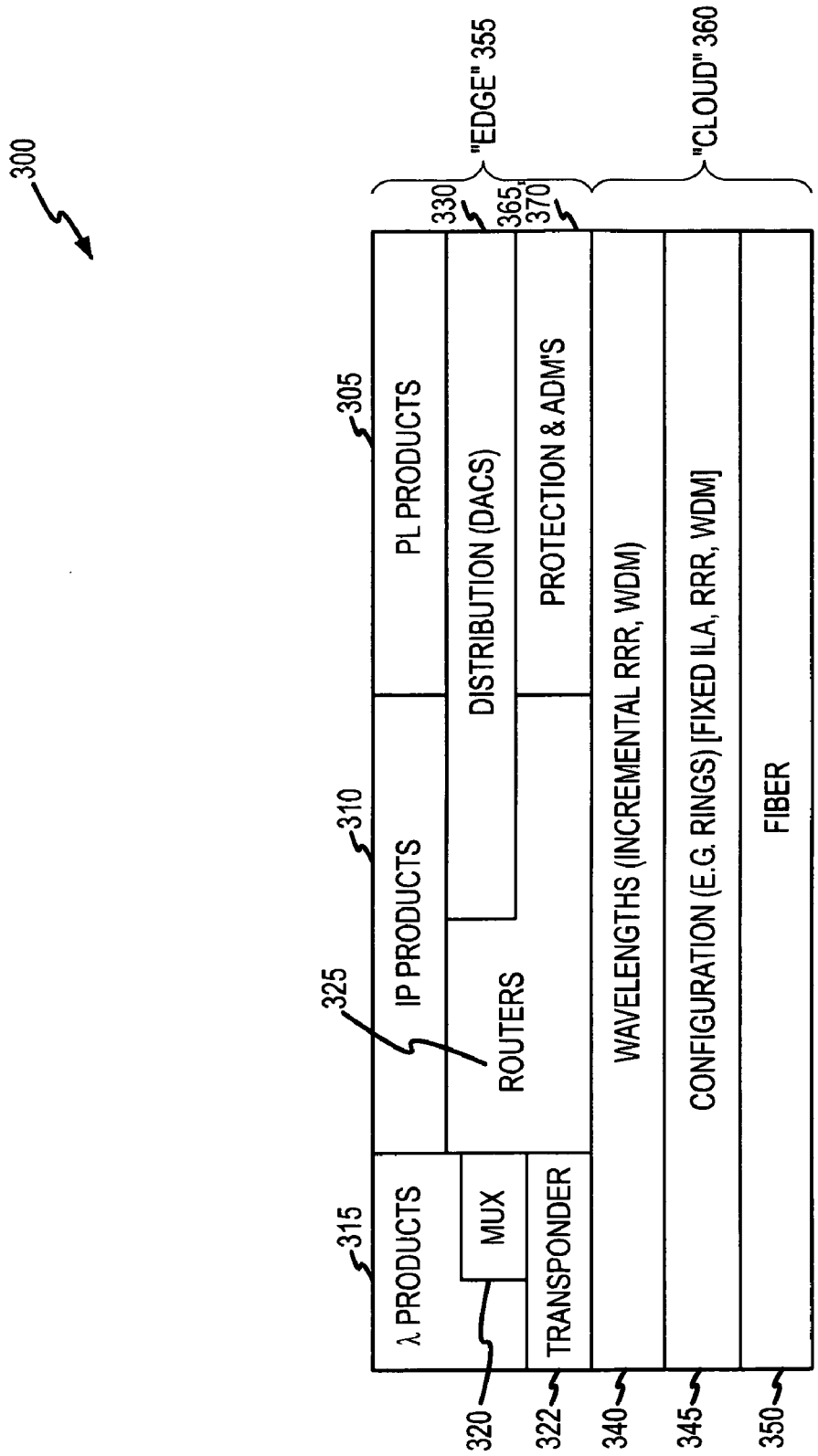
FIG. 3 illustrates the categories of products that could be offered by a fiber optic network, and the types of resources such products could require.

The process of the invention must necessarily be aware of products that are to be made available to customers. If, for example, the network in question is a fiber optic network, products can be divided into three classes, as illustrated in FIG. 3. Private line products 305 and IP products 310 are specified in terms of the framing specification for digital signal transmission (e.g., DS1, DS3) and physical protocols for optical signal transmission (e.g., OC3, OC12, OC48). IP products 310 further include 100T (fast ethernet) and gigabit ethernet (GIGE). Wavelength products 315 include multiplexed products and 10 gigabit wavelengths.

Products can also be mapped to different tiers of resources. Such resources include multiplexers (MUXs) 320, transponders 322, routers 325, digital analog cross connect systems (DACs) 330, protection resources 365, add/drop multiplexers (ADMs) 370, wavelength equipment 340, such as reframe/retime/regenerate units (RRRs, also known as 3Rs) and wavelength division multiplexers (WDMs), ring equipment 345, such as in-line amplifiers (ILAs), RRRs, and WDMs, fibers 350, and conduits.

Resources can be divided into edge resources 355 and cloud resources 360. Edge resources 355 are used by products outside any backbone. Such resources are allocated to specific products. Cloud resources 360 are used within a backbone. Such resources are shared among products and their allocation is ultimately decided during optimization.

With respect to edge resources 355, in an exemplary optical network wavelength products 315 do not use any edge resources 355, except for MUXs 320 and transponders 322. IP products 310 can use routers 325 and DACs 330. Private line products 305 can use protection resources 365 and ADMs 370, together with DACs 330. Note that all products share cloud resources 360, including wavelength hardware 340, ring equipment 345, and fibers 350. As will be seen below, the cost structure of each product is determined by the underlying use of resources.

III. Process

The following section describes the process of the invention in detail.

A. Constraints

Prior to actual optimization, a number of constraints can be defined. In an embodiment of the invention, certain values can be constrained to be non-negative. In an embodiment of the invention, the amount of demand for each given product p in any time period T can be assumed to be greater than or equal to zero:

$$\text{Demand}_{pT} \geq 0, \forall p, T.$$

Likewise, new demand for each product in that time period can also be assumed to be greater than or equal to zero:

$$\text{NewDemand}_{pT} \geq 0, \forall p, T.$$

With respect to resources, the number of wavelengths, rings, and fibers that are bought in each time period T, for each fiber generation g, each technology (r,λ), and each circle c, can be constrained to be greater than or equal to zero:

$$\text{WavelengthBought}_{r\lambda cT} \geq 0, \forall (r,\lambda), c, T$$

$$\text{RingsBought}_{r\lambda cT} \geq 0, \forall (r,\lambda), c, T$$

$$\text{FiberBought}_{r\lambda cT} \geq 0, \forall (r,\lambda), c, T.$$

Likewise, the number of wavelengths, rings, and fibers used in each time period T, for each fiber generation g, each technology (r,λ), and each circle c, can also be constrained to be greater than or equal to zero:

$$\text{WavelengthUsed}_{r\lambda cT} \geq 0, \forall (r,\lambda), c, T$$

$$\text{RingsUsed}_{r\lambda cT} \geq 0, \forall (r,\lambda), c, T$$

$$\text{FiberUsed}_{r\lambda cT} \geq 0, \forall (r,\lambda), c, T.$$

Also, the numbers of wavelengths, rings, and fibers bought in the initial time period $T_0$ are assumed to be known and are constrained to the known values.

With respect to capacity and accommodation of demand, there must be enough installed capacity on each circle to allow traffic on all wavelengths l in the circle:

$$\sum_{(r,\lambda)}^{Technology} \left( \frac{S_T}{1 + C_{Surplus}} \right) \text{WavelengthsUsed}_{r\lambda cT} - \text{Traffic}_{lT} \geq 0, \forall l, T,$$

where $C_{surplus}$ is the surplus capacity and $S_T$ is a scaling parameter.

In addition, the number of wavelengths used must not exceed the wavelengths available in the rings that are present:

$$\text{RingWaves}_{r\lambda}\text{RingsUsed}_{r\lambda cT} - \text{WavelengthUsed}_{r\lambda cT} \geq 0,$$
$$\forall (r,\lambda), c,$$

where $\text{RingWaves}_{r\lambda}$ is the maximum number of available wavelengths for a given technology. Moreover, enough fiber of each generation must be installed on each circle:

$$\text{FiberUsed}_{gcT} - \text{RingFiber}_{r\lambda} \sum_{(r,\lambda)=1}^{3} \text{RingsUsed}_{r\lambda cT} \geq 0,$$

$$\forall g, c, T \in \text{Operational},$$

where $\text{RingFiber}_{r\lambda}$ is the number of fibers per ring.

With respect to price and demand, the price of any product is constrained to be non-increasing with respect to time. This can be expressed in terms of demand:

$$\left( A_{pT-1}^{\eta_{pT}} \cdot \text{Demand}_{pT}^{\eta_{pT}-1} \right) - \left( A_{pT}^{\eta_{pT}-1} \cdot \text{Demand}_{pT-1}^{\eta_{pT}} \right) \geq 0, \forall p, T.$$

A is in calibration constant defined below. With respect to new demand, while it must be non-negative, new demand can be capped for each time period in an embodiment of the invention:

$$\text{Growth Cap} \cdot \sum_{P=1}^{P} \text{Demand}_{pT-1} - \sum_{P=1}^{P} \text{Demand}_{pT} \geq 0, \forall T.$$

With respect to price and demand for any product, in an embodiment of the invention, price elasticity η can be defined as follows:

$$\eta = \frac{\frac{\Delta Q}{Q}}{\frac{\Delta P}{P}}$$

where P represents price and Q represents demand. This corresponds to the following partial differential equation:

$$\eta Q \partial P + P \partial Q = 0.$$

Consequently, $$Q_T = A_T \cdot P_T^{-\eta_T}$$

where $A_T$ is a calibration constant that can be viewed as market potential at time T. $A_T$ is obtained from an initial price-demand relationship discussed above. Note that price elasticity l can be constrained to be constant with respect to price, although it may vary with respect to time.

Figure 4:
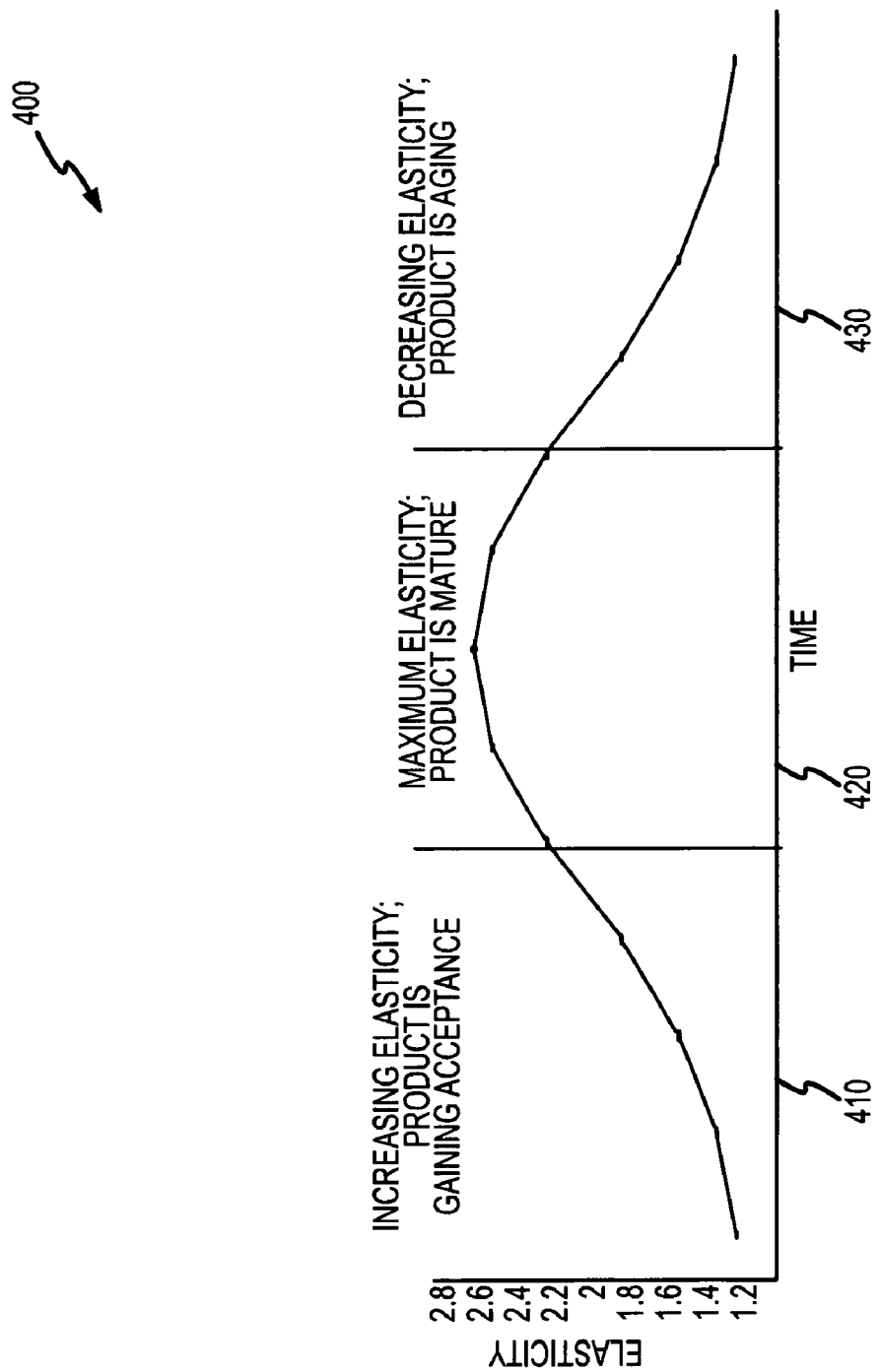
FIG. 4 illustrates the changes of price elasticity of a product over time.

The time-dependent price elasticity is assumed to follow a bell-shaped curve that also reflects product maturity. This is illustrated in FIG. 4. Elasticity increases as a product gains acceptance in stage 410, levels off when the product is mature in stage 420, and decreases as the product is aging in stage 430. For each product, the length of the product cycles and phase components (and hence the elasticity) are obtained from marketing analysis in an embodiment of the invention. Note that in an embodiment of the invention, this model does not capture cross-elasticity between products.

The allocation of demand can also be constrained. Marketing studies, for example, can be used to determine both the magnitude and geographical location of demand in a network. Hence, the fraction of overall demand that is attributed to any given node pair is known and assumed to be constant. Moreover, the initial price and demand for any product at time period $T_0$ are also constrained to assumed values.

In an embodiment of the invention, the available technology is also constrained. For fiber optic networks, the set of available data rates can be defined to be $\{r\}=\{192, 768, 769, 1536, 1537\}$. Here, 192 refers to OC 192, etc. The number of available wavelengths per fiber can be drawn from the set $\{\lambda\}=\{32, 48, 64, 80, 96, 112, 128, 160\}$. The set of available technologies is defined as a subset of combinations of elements in the two sets, $\{(r,\lambda)\}$.

Finally, cost compression can be a constraint. In an embodiment of the invention, cost compression is fixed at fifty percent.

B. Revenue Modeling

Figure 5:
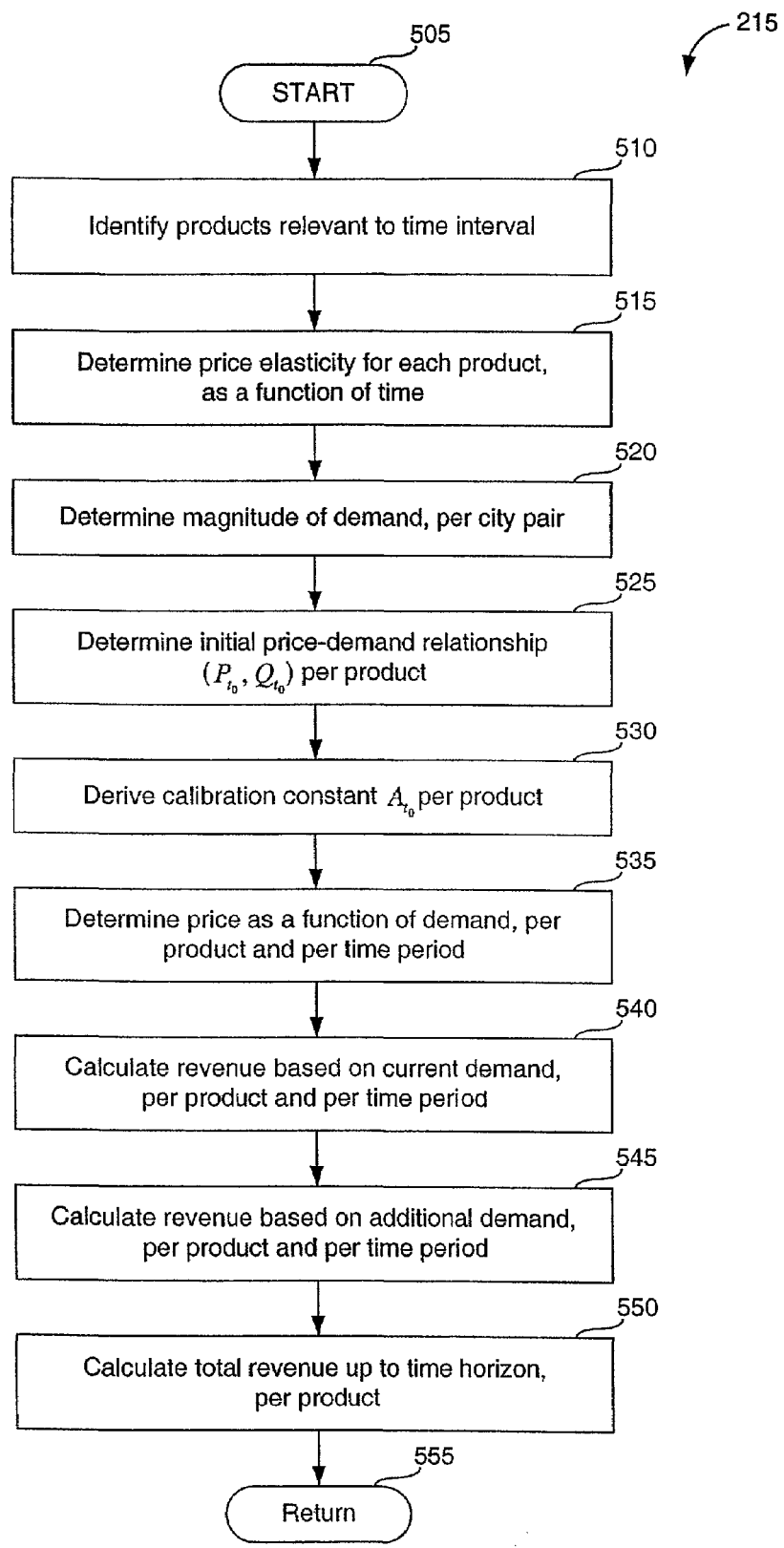
FIG. 5 is a flowchart illustrating the steps of calculating total revenue, according to an embodiment of the invention.

The step of modeling revenue (step 215 of FIG. 2) is illustrated in greater detail in FIG. 5. The process begins with step 505. In step 510, the set of available products is identified for each period in the defined time interval. In step 515, the price elasticity for each product is determined as a function of time. In step 520, the magnitude of demand is determined per node pair, and per time period. In step 525, the initial price and demand are determined per product. In step 530 the calibration constant $A_{T_0}$ is determined per product. In step 535, price is determined as a function of demand for each product and for each time period. In step 540 revenue is calculated based on the current demand, per time period and per product. In step 545, additional revenue per time period and product is calculated, wherein the additional revenue is that which arises based on additional demand in the time period. In step 550, the total revenue is calculated for all time periods up to the end of the time interval, per product. The process concludes at step 555. Mathematically, the revenue model can be expressed as follows:

Total Revenue =

$$n \sum_{T=1}^{T_{last}} d_T \left( \sum_{p=1}^{P} \gamma (Revenue_{pT}^{Current\ Demand} + Revenue_{pT}^{New\ Demand}) \right)$$

wherein $Revenue_{pT}^{CurrentDemand} = \alpha(Price_{pT-1} + Price_{pT})Demand_{pT-1}$, $Revenue_{pT}^{NewDemand} = \beta(Demand_{pT} - Demand_{pT-1})Price_{pT}$, where $\alpha$ and $\beta$ are scaling factors, $$Price_{pt}(Demand_{pt}) = \left( \frac{\beta_{pt} A_p}{Demand_{pt}} \right)^{1/\eta_{pt}},$$

where $\beta_{pT}$ is a share growth parameter, $$A_{pt} = Price_{pt}^{\eta_{pt}}, \text{ and } \eta = -\frac{\frac{\Delta Q}{Q}}{\frac{\Delta P}{P}}$$

C. Network Topology Modeling

This section describes the modeling of a network topology. This entails representation of the network infrastructure, the amount and location of demand placed on the infrastructure, and required capacity.

1. Nodes/Rings/Circles/Links Concept

The invention uses an abstract representation of the topology of a communications network. The representation is composed of the following elements:

- A set of nodes. Each node represents a distribution site or a gateway.
- A set of links. A link is a chain of actual physical network segments.
- A set of rings. Each ring is defined as a set of links that share a common technology, a common number of wavelengths, and a common fiber cable.
- A set of circles. A circle is defined as a set of links that appears in one or more rings in a network, and hence constitutes ring building blocks.

A ring can be viewed as a conceptual construct. It represents an ability to add more channels. A circle, on the other hand, is a physical place (i.e., infrastructure) where one can put a ring.

Figure 6:
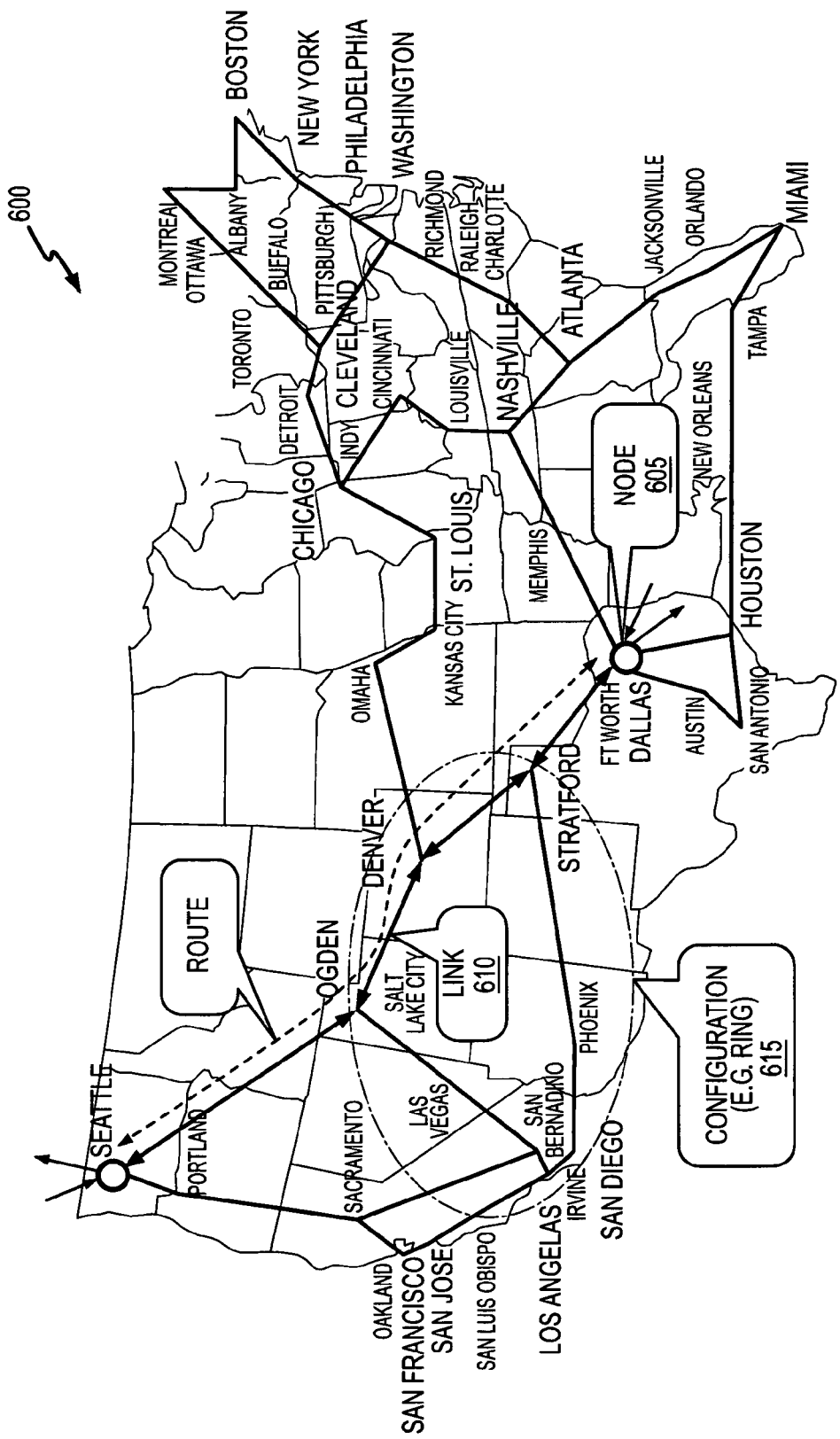
FIG. 6 illustrates an example network topology.

Some of these concepts are illustrated in FIG. 6, which shows a communications network in the continental United States. An example node 605 is illustrated at Dallas/Fort Worth. A link 610 is shown connecting nodes at Denver and Ogden. A ring 615 is shown connecting nodes at Denver, San Diego, Los Angeles, and other locations. Note that nodes can be viewed as locations at which traffic can be added or dropped off of a backbone and where rings interconnect.

In an embodiment of the invention, technology usage is only captured at ring or circle level. If capacity is added to a link, the capacity of other links in the ring might have to be increased. If this increase is applied to the highest capacity link in the ring, then all other links in the ring have to be increased as well in networks operating in asynchronous transfer mode (ATM).

2. Demand

The invention requires that the routing of demand per node pair be calculated. Ways to achieve this particular step are well-known in the art. One way to perform routing is to perform shortest path routing. Moreover, such routing need not be optimal. The output of the routing step is a routing matrix that captures the usage of each link by each node pair in the logical network topology. If there is a single path between each node pair, the matrix has binary elements, each of which is set to either 1 if traffic flows on the link or 0 otherwise. If there are multiple paths that are possible between a pair of nodes, then the elements in the matrix will be either 1/n or 0, depending on whether the link is used or not. Here, n is equal to the number of possible paths that can be taken to connect the node pair. It is assumed that routing is based on a fixed topology that does not change throughout the time interval.

3. Capacity

The level of demand at each link translates to a level of traffic. Given this level of traffic, the communications service provider must provide specific numbers and types of products. The selected products must then have a capacity that meets or exceeds the level of traffic. The capacity for each link is determined by summing capacity across the products used at the node pair associated with the link.

D. Cost Modeling

Figure 7:
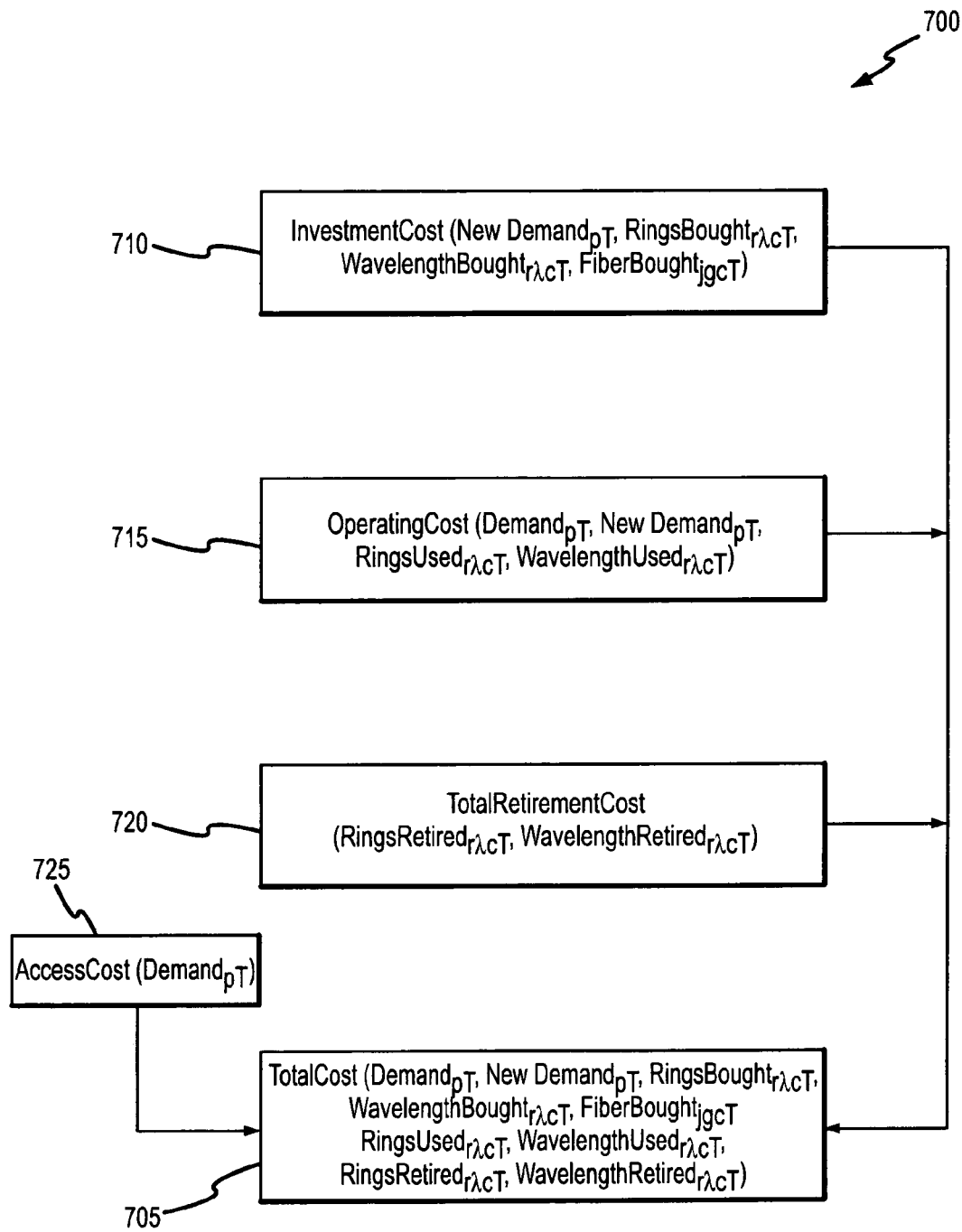
FIG. 7 is a flowchart illustrating the steps of modeling costs, according to an embodiment of the invention.

FIG. 7 illustrates the determination of the total cost that must be expended by a communications service provider for a given product at a time period T for a given technology, circle, and fiber generation. Total cost 705 is shown as a function of subordinate costs, i.e., investment cost 710, operating cost 715, total retirement cost 720, and access cost 725. Note that operating cost 715 in turn depends on network services costs 730. The mathematical formulation of total cost 705 will be described in greater detail below, as well as the subordinates costs.

1. Technologies

Before discussing cost formulations for a communications network, it should be noted that costs differ with technologies and communications media (e.g., fiber types). Depending on the nature of the communications network, the available service may be limited to a fixed number of technologies. In the case of an optical fiber network, for example, transmission rates may be limited to one of $\{r\}=\{192, 768, 769, 1536, 1537\}$. Here, 192 refers to OC 192, etc. In addition, the maximum number of wavelengths on a link may be constrained to one of several. Again, in an optical fiber network, the maximum number of wavelengths per fiber may be limited to one of $\{\lambda\}=\{32, 48, 64, 80, 96, 112, 128, 160\}$. In this case, the set of currently available technologies is defined as a subset of all the possible combinations developments in the two above sets, and indexed by the ordered pair $(r, \lambda)$. In an example optical fiber network, the set of available technologies can be represented as $$\text{Technology} = \begin{cases} (192, 32)(768, 48)(769, 64)(1536, 48)(1537, 96) \\ (192, 64)(768, 64)(769, 80)(1536, 64)(1537, 112) \\ (192, 96)(768, 80)(769, 96)(1536, 80)(1537, 128) \\ \qquad\qquad\qquad\qquad\qquad (1536, 96)(1537, 160) \end{cases}$$

In the case of an optical fiber network, fiber can be specified by generation and type. In an embodiment of the invention, there are eight possible fiber generations identified, denoted by the integers 1 through 8. In other embodiments, a different number of generations can be identified. There are also five different sizes of cables, where each cable size holds a given number of fibers. At present, a cable can hold either 8, 16, 32, 64 or 128 fibers. A fiber cable can therefore be identified in terms of generation and size by the ordered pair j, g), where j represents the fiber generation and g represents the cable size.

2. Investment Costs

Figure 8:
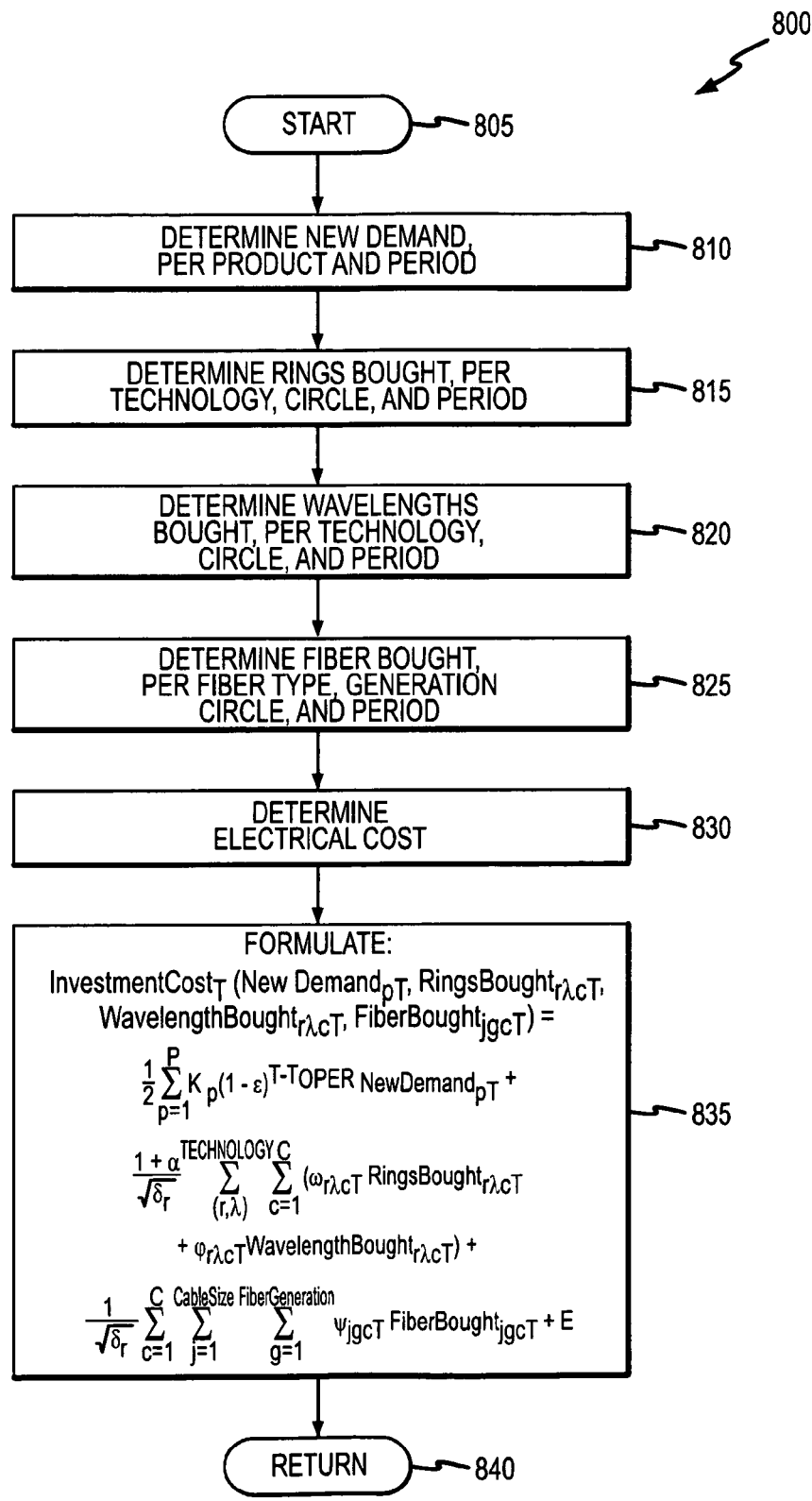
FIG. 8 is a flowchart illustrating the steps of determining investment costs, according to an embodiment of the invention.

As described above, the total costs that must be paid out by a communications service provider depend on the investment costs. The determination of investment costs is illustrated in FIG. 8. The process starts with step 805. In step 810, the new demand for each product in each time period is determined, $\text{NewDemand}_{pT}$. In step 815, the number of rings bought, per technology, circle, and period is determined, $\text{RingsBought}_{r\lambda cT}$. In step 820, the number of wavelengths bought, per technology, circle, and period is determined, $\text{WavelengthsBought}_{r\lambda cT}$. In step 825, the amount of fiber bought, per fiber type, generation, circle, and period, is determined, $\text{FiberBought}_{jgcT}$. In step 830, the total electrical cost E is determined. In step 835, the total investment cost for a time period T is determined according to the equation $$\text{InvestmentCost}_T(\text{NewDemand}_{pT}, \text{RingsBought}_{r\lambda cT}, \\ \text{WavelenghtBought}_{r\lambda cT}, \text{FiberBought}_{jgcT}) = \\ \frac{1}{2}\sum_{p=1}^{P}(K_p(1-\epsilon))^{T-T_{OPER}}\text{NewDemand}_{pT} + \frac{1+\alpha}{\sqrt{\delta_T}} \\ \sum_{(r,\lambda)}^{Technology}\sum_{c=1}^{C}(\omega_{r\lambda cT}\text{RingsBrought}_{r\lambda cT} + \varphi_{r\lambda cT}\text{WavelengthBought}_{r\lambda cT}) + \\ \frac{1}{\sqrt{\delta_T}}\sum_{c=1}^{C}\sum_{j=1}^{CableSize}\sum_{g=1}^{FiberGeneration}\psi\text{FiberBought}_{jgcT} + E$$

where $\kappa_p$=sum of DACS, router, transponder, and MUX costs for product p, $\epsilon$=cost compression factor, $\delta_T$=yearly discount rate in time period T, $\alpha$=equipment cost factor, $\omega_{r\lambda cT}$=ring cost for circle c, technology $(r,\lambda)$ and time period T, $\phi_{r\lambda cT}$=wavelength cost for circle c, technology $(r,\lambda)$ and time period T, $\psi_{jgcT}$=fiber cost for circle c, fiber generation g, cable size j, and time period T.

Note that the specific costs for purchasing network components, e.g., $\kappa_p$ and $\psi_{jgcT}$, are driven by the marketplace and are not directly controlled by any process described herein.

The process concludes with step 840.

3. Operating Costs

Figure 9:
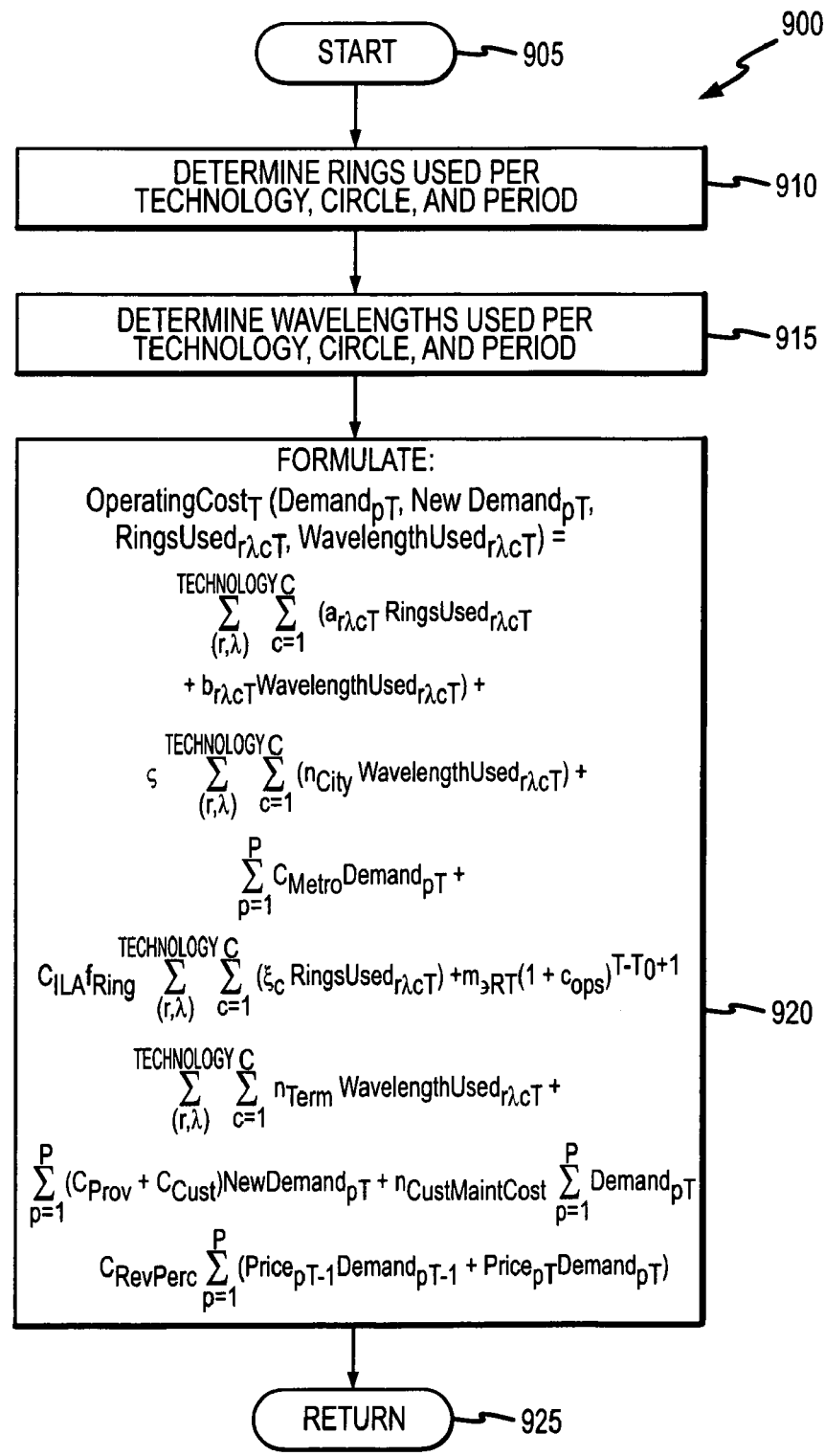
FIG. 9 is a flowchart illustrating the steps of calculating operating costs, according to an embodiment of the invention.

Total costs also depend on the extent of operating costs. The calculation of operating costs is illustrated in FIG. 9. The process begins with step 905. In step 910, the number of rings used per technology, circle, and period is determined ($\text{RingsUsed}_{r\lambda cT}$). In step 915, the number of wavelengths used per technology, circle, and period is determined ($\text{WavelengthsUsed}_{r\lambda cT}$). In step 920 the total operating cost for time period T is determined according to the equation $$\text{OperatingCost}_T = \text{VendorTechnicalSupportCost}_T + \\ \text{MetroOperatingExpense}_T + \text{IntercityOperationExpense}_T + \text{ProvisioningExpense}_T + \text{BusinessExpense}_T.$$

The constituent operating costs are modeled as follows:

$$\text{VendorTechnicalSupportCost}_T = \\ \sum_{(r,\lambda)}^{Technology}\sum_{c=1}^{C}(a_{r\lambda cT}\text{RingsUsed}_{r\lambda cT} + b_{r\lambda cT}\text{WavelengthsUsed}_{r\lambda cT}),$$

where $a_{r\lambda cT}$=vendor O&M ring expense per circle and $b_{r\lambda cT}$=vendor O&M wave expense per circle.

$$\text{MetroOperationExpense}_T = \varsigma\sum_{(r,\lambda)}^{Technology}\sum_{c=1}^{C}(n_{city}\text{WavelengthsUsed}_{r\lambda cT}),$$

where
- $\zeta$=long haul ADM maintenance cost per unit,
- $n_{city}$=number of cities of type ADM, and
- $C_{metro}$=metro equipment maintenance cost.

$$IntercityOperationExpense_T = c_{ILA}f_{ring}\sum_{(r,\lambda)}^{Technology}\sum_{c=1}^{C}\xi RingsUsed_{r\lambda cT} +$$

$$(M_{3RT}(1+C_{ops}))^{T-T_o+1}\sum_{(r,\lambda)}^{Technology}\sum_{c=1}^{C}n_{term}WavelengthsUsed_{r\lambda cT},$$

where
- $c_{ILA}$=maintenance cost for ILA,
- $f_{ring}$=fiber per ring,
- $\xi_c$=circle distance,
- $M_{3RT}$=maintenance cost for RRR terminals,
- $C_{ops}$=operating cost increment, and
- $n_{term}$=sum of number of terminals.

$$ProvisioningExpense_T =$$

$$\sum_{p=1}^{P}(C_{Prov}+C_{cust})NewDemand_{pT} + n_{CustMainCost}\sum_{p=1}^{P}Demand_{pT},$$

where
- $C_{prov}$=provisioning cost,
- $C_{cust}$=cost equivalent per new DS3 for CIM and order entry, and
- $n_{CustMainCost}$=sum of customer maintenance costs.

$$BusinessExpense_T =$$

$$c_{RevPerc}\sum_{p=1}^{P}(Price_{pT-1}Demand_{pT-1}+Price_{pT}Demand_{pT}),$$

where
- $C_{RevPerc}$=scaled percentage of revenue expenses.

The process concludes at step 925.

4. Retirement Costs

Figure 10:
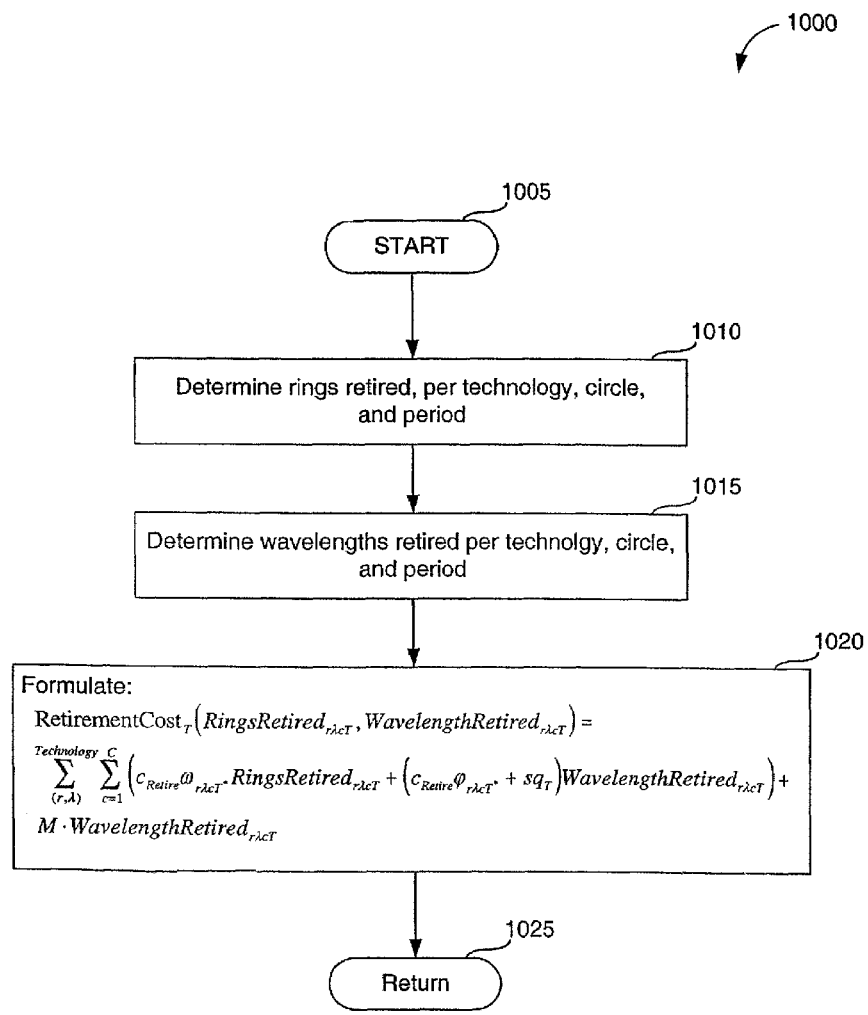
FIG. 10 is a flowchart illustrating the steps of calculating retirement costs, according to an embodiment of the invention.

The total costs are also affected by the retirement costs. The determination of retirement costs is illustrated in FIG. 10. The process begins with step 1005. In step 1010, the number of rings retired, per technology, circle, and period is determined (RingsRetired$_{r\lambda cT}$). In step 1015, the number of wavelengths retired, per technology, circle, and period is determined (WavelengthsRetired$_{r\lambda cT}$). In step 1020, the retirement costs for a time period T is calculated according to the equation $$TotalRetirementCost_T =$$

$$\sum_{(r,\lambda)}^{Technology}\sum_{c=1}^{C}(c_{Retire}\omega_{r\lambda cT}, RingsRetired_{r\lambda cT}+(c_{Retire}\varphi_{r\lambda cT},+sp_T)$$

$$WavelengthRetired_{r\lambda cT})+M\cdot WavelengthRetired_{r\lambda cT}$$

where
- $C_{Retire}$=retirement cost factor,
- $\omega_{r\lambda cT^*}$=ring cost per circle at time available,
- $\phi_{r\lambda cT^*}$=wave cost per circle at time available,
- s=scaling factor,
- $q_T$=provisioning cost factor, and
- M is a constant.

The process concludes at step 1025.

5. Access Costs

Access costs also affects the total costs which must be expended by a communications service provider. The access expense in a period T is calculated as the sum of all local access expenses per DS3 according to the equation $$AccessCost(Demand_{pT}) = \sum_{p=1}^{P}\phi_{pT}Demand_{pT}$$

where $\phi_{pT}$ is the local access costs per DS3.

6. Formulation of Total Costs

Figure 11:
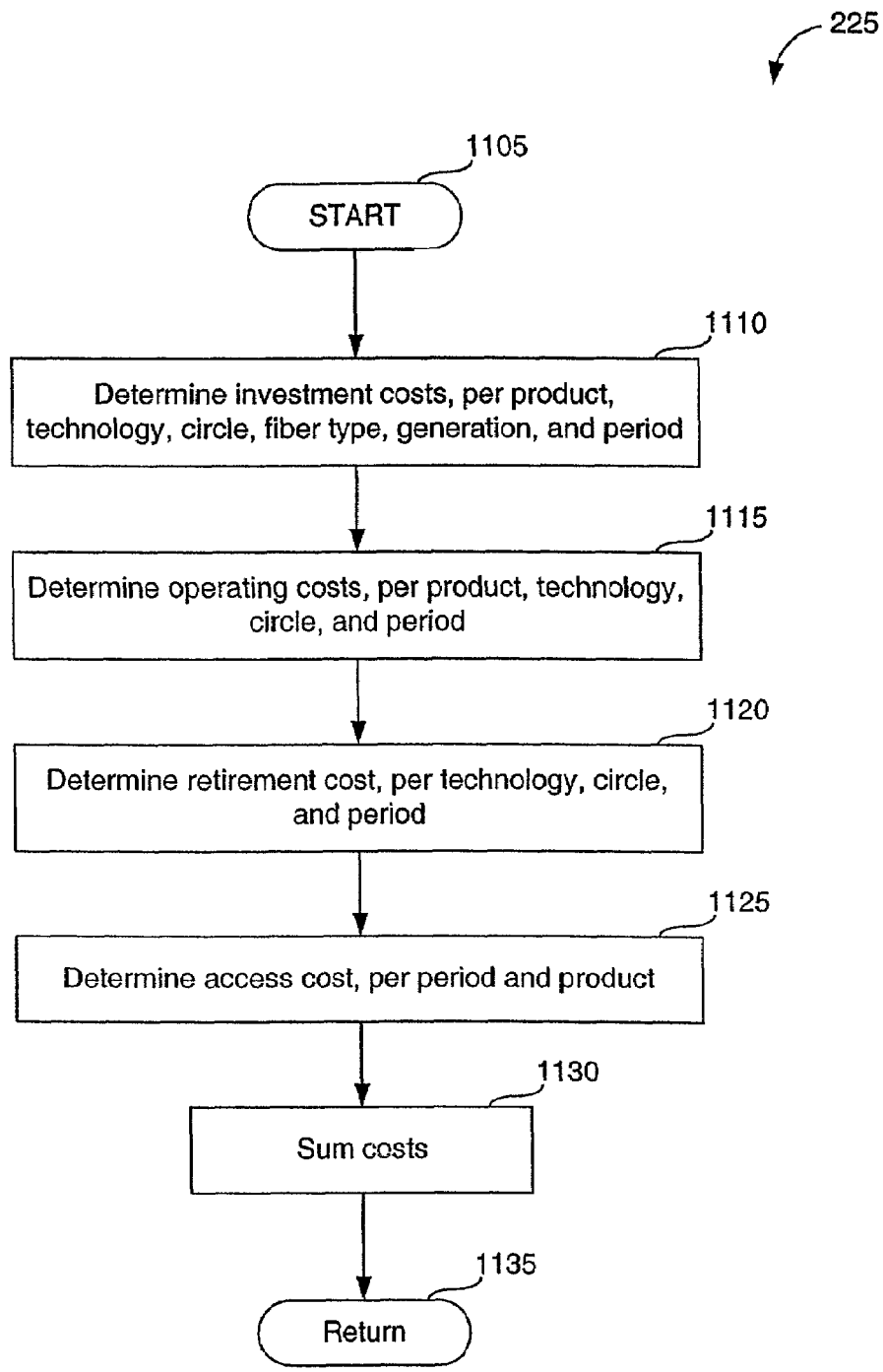
FIG. 11 is a flowchart illustrating the basic components of the total cost determination, according to an embodiment of the invention.

The formulation of total costs (step 225 of FIG. 2) is illustrated in FIG. 11. The process begins with step 1105. In step 1110, the investment costs are determined per product, technology, circle, fiber type, generation, and period, as described above. In step 1115, the operating costs are determined per product, technology, circle, and period, and described above. In step 1120 the retirement cost is determined, per technology, circle, and period, as described above. In step 1125, the access cost is determined, per period and product, as described above. In step 1130, all of the above costs are summed. The process ends at step 1135.

E. Optimization

1. General

The following section describes the objective function to be optimized, the free variables that can be manipulated to achieve optimization.

a. Free Variables

The following table summarizes all free variables that are used in the invention:

| Variable name | Indices | Type |
| --- | --- | --- |
| Demand$_{pT}$ | product, time | Fractional |
| NewDemand$_{pT}$ | product, time | Fractional |
| WavelengthBought$_{r\lambda cT}$ | technology, circle, time | Integer |
| WavelengthUsed$_{r\lambda cT}$ | technology, circle, time | Integer |
| RingsBought$_{r\lambda cT}$ | technology, circle, time | Integer |
| RingsUsed$_{r\lambda cT}$ | technology, circle, time | Integer |
| FiberBought$_{jgcT}$ | size, generation, circle, time | Integer |

| Variable name | Indices | Type |
|---|---|---|
| $\text{FiberUsed}_{gcT} = \sum_{j \in \text{CableSize}} j \cdot \text{FiberCable}_{jgcT}$ | generation, circle, time | Integer | where Fiber Cable$_{jgcT}$ is the number of fiber cables in a circle for a given cable size, generation and time period.

All remaining expressions can be derived in terms of the above free variables.

b. Objective Function

The objective function represents the NPV as the difference between total revenue and total costs. This is expressed as follows:

$$NPV = TotalRevenue - \sum_{T=1}^{T_{LAST}} d_T TotalCost_T$$

The NPV must then be maximized by choosing the appropriate values for the free variables. Note that the total cost per time period can be expressed as the sum of investment, operation, access and retirement costs as described above. The equation for total cost can be rewritten as follows $$TotalCost_T = \sum_p (C_{pT}^{Demand} Demand_{pT} +$$

$$C_{pT}^{NewDemand} NewDemand_{pT}) +$$

$$\sum_{r\lambda c}(C_{r\lambda cT}^{RingsBought} RingsBought_{r\lambda cT} +$$

$$C_{r\lambda cT}^{WavelengthBought} WavelengthBought_{r\lambda cT}) +$$

$$\sum_{jgc} C_{jgcT}^{FiberBought} FiberBought_{jgcT} +$$

$$\sum_{r\lambda c}(C_{r\lambda cT}^{RingsUsed} RingsUsed_{r\lambda cT} +$$

$$C_{r\lambda cT}^{WavelengthUsed} WavelengthUsed_{r\lambda cT})$$

This illustrates the linearity of total cost with respect to the free variables.

c. Process

Figure 12:
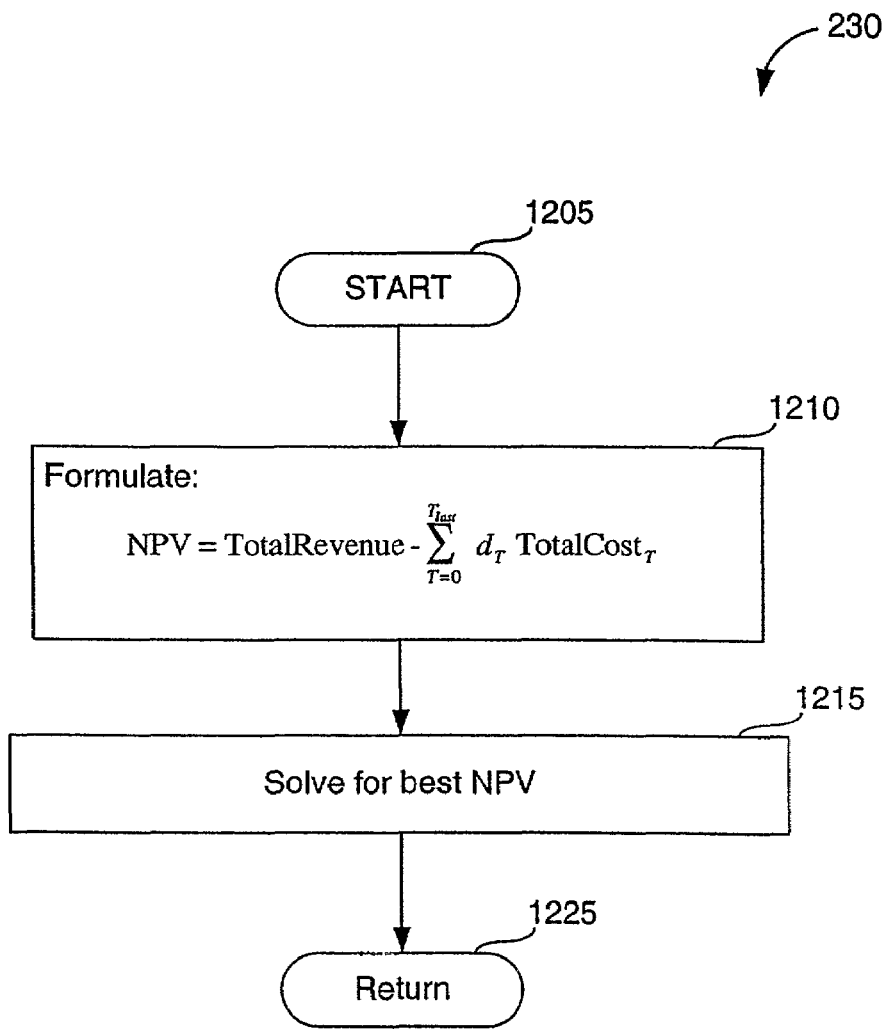
FIG. 12 is a flowchart illustrating the steps of NPV optimization, according to an embodiment of the invention.

The step of optimization (step 230 of FIG. 2) is illustrated in FIG. 12. The process begins with step 1205. In step 1210, NPV is formulated as above, $$NPV = TotalRevenue - \sum_{T=1}^{T} d_T TotalCost_T$$

In step 1215, the above equation is solved for the greatest NPV. A number of optimization algorithms are know in the art and are implemented in software that is publicly available. These include the MINOS and SNOPP software packages, both produced by the Systems Optimization Laboratory of the Department of Operations Research, Stanford University. Another available package is LOQO, produced by John Vanderbei of Princeton University. The process concludes at step 1220.

2. Price Profile Heuristic

Figure 13:
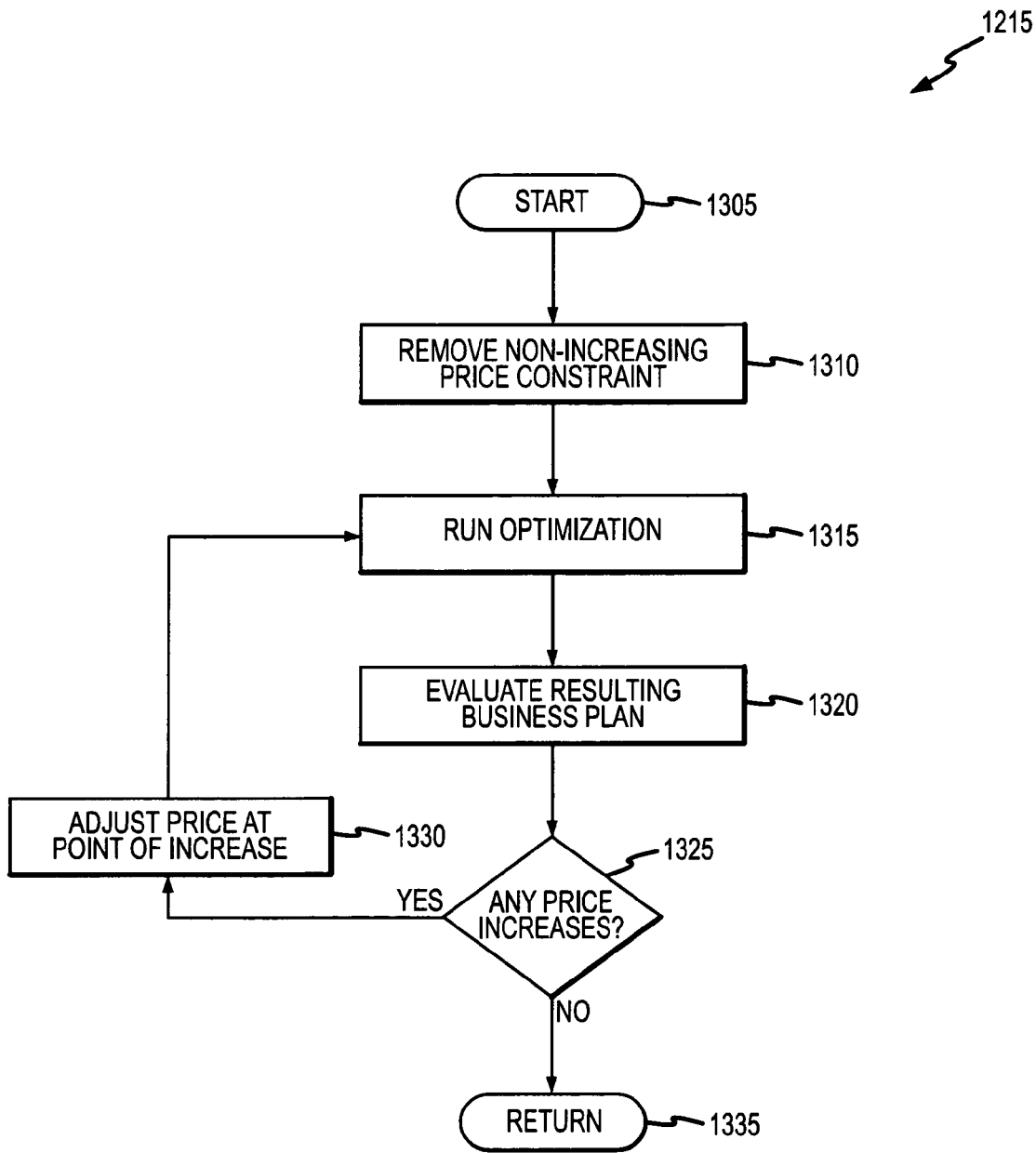
FIG. 13 is a flowchart illustrating the steps of applying a price profile heuristic, according to an embodiment of the invention.

As discussed above, the solution step 1215 of FIG. 12 above can be performed using techniques and/or available software products that are well-known in the art. The solution, however, may not be optimal or unique. To determine a near-optimal solution, a price profile heuristic can be applied. This is illustrated in FIG. 13. The process begins with step 1305. In Step 1310, the non-increasing price constraint is removed. In step 1315, the optimization is then run. In step 1320, the resulting business plan is evaluated. As discussed above, the plan produced by the optimization defines a schedule for equipment and fiber deployment and for product pricing. In Step 1325, a determination is made as to whether the resulting plan includes any prices increases for any products. If not, then the process concludes at step 1335. If, however, price increases are detected, then the process continues at step 1330. Here the price increases are removed. The optimization is performed again at step 1315. The process continues until no price increases are detected in step 1325.

IV. Computing Environment

Figure 14:
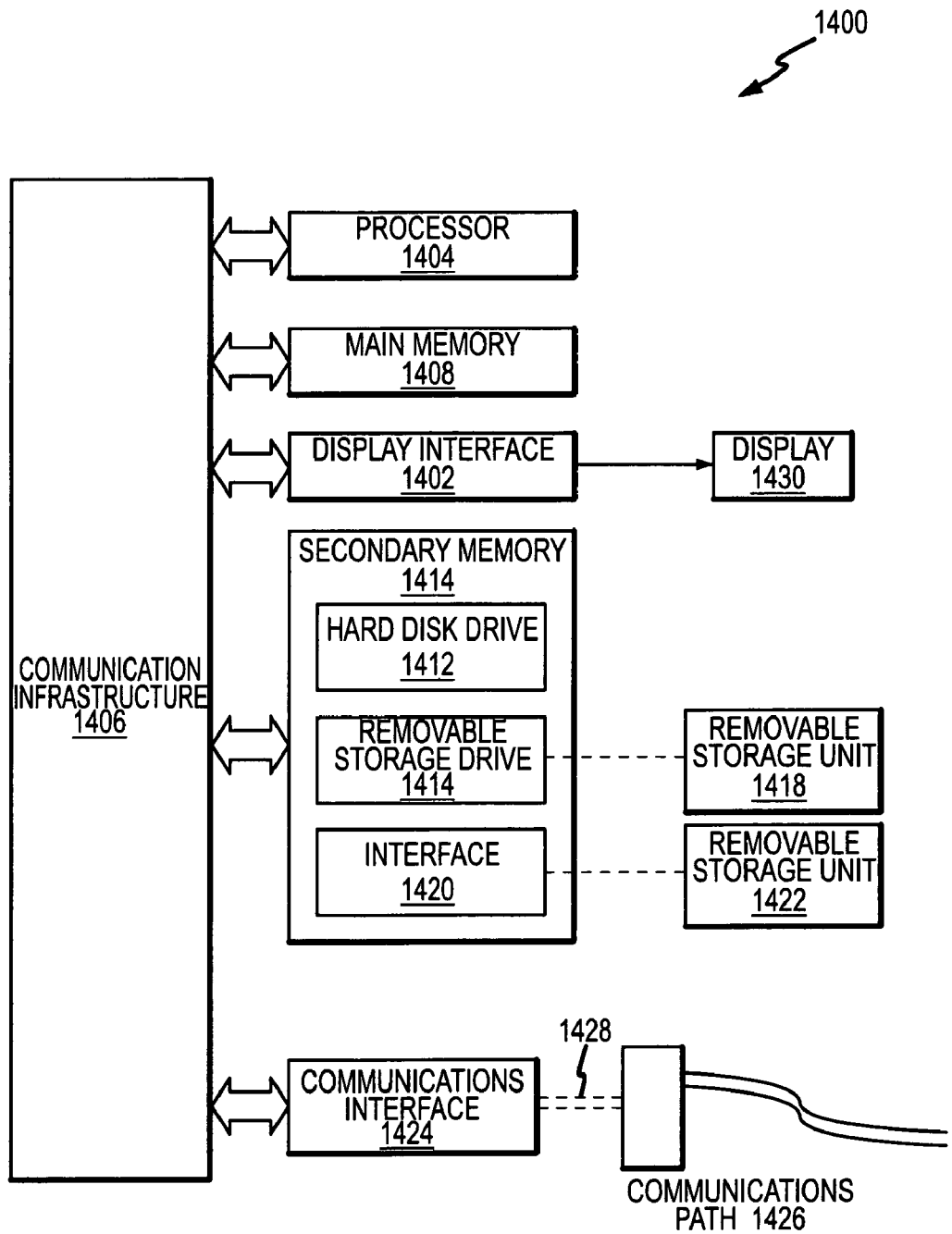
FIG. 14 is a block diagram illustrating a computing environment for a software embodiment of the invention.

The invention may be implemented using hardware, software or a combination thereof and may be implemented in a computer system or other processing system. An example of such a computer system 1400 is shown in FIG. 14. The computer system 1400 includes one or more processors, such as processor 1404. The processor 1404 is connected to a communication infrastructure 1406 (e.g., a bus or network). Various software embodiments can be described in terms of this exemplary computer system. After reading this description, it will become apparent to a person skilled in the relevant art how to implement the invention using other computer systems and/or computer architectures.

Computer system 1400 also includes a main memory 1408, preferably random access memory (RAM), and may also include a secondary memory 1410. The secondary memory 1410 may include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well known manner. Removable storage unit 1418 represents a floppy disk, magnetic tape, optical disk, etc. As will be appreciated, the removable storage unit 1418 includes a computer usable storage medium having stored therein computer software and/or data.

Secondary memory 1410 can also include other similar means for allowing computer programs or input data to be loaded into computer system 1400. Such means may include, for example, a removable storage unit 1422 and an interface 1420. Examples of such may include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 may also include a communications interface 1424. Communications interface 1424 allows software and data to be transferred between computer system 1400 and external devices. Examples of communications interface 1424 may include a modem, a network interface (such as an Ethernet card), a communications port, a PCMCIA slot and card, etc. Software and data transferred via communications interface 1424 are in the form of signals 1428 which may be electronic, electromagnetic, optical or other signals capable of being received by communications interface 1424. These signals 1428 are provided to communications interface 1424 via a communications path (i.e., channel) 1426. This channel 1426 carries signals 1428 and may be implemented using wire or cable, fiber optics, a phone line, a cellular phone link, an RF link and other communications channels. In an embodiment of the invention, signals 1428 entering computer system 1400 can include constraint information, such as the cost compression rate, initial values for price and demand per product, and the demand matrix. Outgoing signals 1428 can include information that defines an optimal business plan, such as the allocation of resources and the prices for available products, at each time period of interest.

In this document, the terms "computer program medium" and "computer usable medium" are used to generally refer to media such as removable storage drive 1414, a hard disk installed in hard disk drive 1412, and signals 1428. These computer program products are means for providing software to computer system 1400. The invention is directed to such computer program products.

Computer programs (also called computer control logic) are stored in main memory 1408 and/or secondary memory 1410. Computer programs may also be received via communications interface 1424. Such computer programs, when executed, enable the computer system 1400 to perform the features of the present invention as discussed herein. In particular, the computer programs, when executed, enable the processor 1404 to perform the features of the present invention. Accordingly, such computer programs represent controllers of the computer system 1400.

V. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A method of maximizing a net present value (NPV) of a cash flow that results from provision of communication services between nodes of a network, wherein maximization is achieved through selection of an appropriate combination of network components and product prices over a plurality of consecutive time periods, the method comprising the steps of:

(a) receiving constraint information regarding demand for products, prices of products, network topology, available technology, costs, and an initial state of the network;

(b) forming an expression that models revenue received as a result of sales of products at each time period T, wherein the revenue expression is a function of price and demand for each product p at each time period T; wherein the revenue expression is:

$$TotalRevenue = n \sum_{T=1}^{T_{last}} d_T \left( \sum_{p=1}^{P} \gamma (Revenue_{pT}^{CurrentDemand} + Revenue_{pT}^{NewDemand}) \right)$$

wherein $Revenue_{pT}^{CurrentDemand} = \alpha(Price_{pT-1} + Price_{pT})Demand_{pT-1}$, $Revenue_{pT}^{NewDemand} = \beta(Demand_{pT} - Demand_{pT-1})Price_{pT}$, where $\alpha$ and $\beta$ are sealing factors, $$Price_{pT}(Demand_{pT}) = \left( \frac{\beta_{pT} A_{pT}}{Demand_{pT}} \right)^{1/\eta_{pT}},$$

where $\beta_{pT}$ is a share growth parameter, $$A_{pT} = (Price_{pT} Demand_{pT}), \text{ and } \eta = -\frac{\frac{\Delta Q}{Q}}{\frac{\Delta P}{P}},$$

where $P$ is price and $Q$ is demand.

(c) determining traffic capacity for each link at each time period T;

(d) forming an expression that models costs of providing communications services, wherein the cost expression is a function of demand for each product p at each time period T and of the number of rings and wavelengths bought, used, and retired, for each technology, circle, and time period T;

(e) forming an expression that models NPV as an objective function of revenue and costs; and (f) optimizing the objective function.

2. The method of claim 1, further comprising the step of:

(g) using the optimization to determine network components for each link in the communications network, the timing and location of the deployment of the components, the prices of products, and the timing of price changes.

3. The method of claim 1, wherein the constraint information regarding demand for products comprises the following:

(a) non-decreasing demand from any time period to the next, wherein the extent of any demand increase from one time period to the next is capped;

(b) a predetermined level of demand for each link and each product in an initial time period; and (c) a fixed proportion of total network-wide demand for each link.

4. The method of claim 1, wherein the constraint information regarding prices of products comprises the following:

(a) a non-increasing price for each product for any time period to the next;

(b) a constant price elasticity with respect to price for each product;
(c) a bell-shaped curve for the elasticity of any product over time; and
(d) a predetermined price for each product in an initial time period.

5. The method of claim 1, wherein the constraint information regarding network topology comprises the following:
   (a) a fixed set of nodes requiring connectivity; and
   (b) a fixed set of links providing the connectivity.

6. The method of claim 1, wherein the constraint information regarding available technology comprises the following:
   (a) a predetermined set of possible combinations of data rates and maximum numbers of wavelengths for a fiber, wherein any technology is an element of the predetermined set;
   (b) a predetermined set of fiber generations, wherein any fiber belongs to one of the fiber generations.

7. The method of claim 1, wherein the constraint information regarding costs comprises the following:
   (a) the prevailing market cost of each network component at each time period T; and
   (b) a predetermined fixed cost compression rate.

8. The method of claim 1, wherein the constraint information regarding the initial state of the network comprises the following:
   (a) the number of wavelengths bought in an initial time period;
   (b) the number of rings bought in the initial time period; and
   (c) the amount of fiber bought in the initial time period.

9. The method of claim 1, wherein said step (c) comprises the step of determining the network components necessary to provide the determined capacity for each link at each time period T.

10. The method of claim 1, wherein the cost expression is $\Sigma d_T \text{TotalCost}_T$, where $$\text{TotalCost}_T = \text{InvestmentCost}_T + \text{OperatingCost}_T + \text{AccessCost}_T + \text{TotalRetirementCost}_T, \text{ and}$$

$$d_T = \left(\frac{1}{1+r}\right)^{T-T_0},$$

a present value factor, where r is an average inflation rate.

11. The method of claim 10, wherein $$\text{InvestmentCost}_T(\text{NewDemand}_{pT}, \text{RingsBought}_{r\lambda cT},$$
$$\text{WavelengthBought}_{r\lambda cT}, \text{FiberBought}_{jgcT}) =$$

$$\frac{1}{2}\sum_{p=1}^{P}(K_p(1-\epsilon))^{T-T_{OPER}}\text{NewDemand}_{pT} + \frac{1+\alpha}{\sqrt{\delta_T}}$$

$$\sum_{(r,\lambda)}^{Technology}\sum_{c=1}^{C}(\omega_{r\lambda cT}\text{RingsBrought}_{r\lambda cT} + \varphi_{r\lambda cT}\text{WavelengthBought}_{r\lambda cT}) +$$

$$\frac{1}{\sqrt{\delta_T}}\sum_{c=1}^{C}\sum_{j=1}^{CableSize}\sum_{g=1}^{FiberGeneration}\psi_{jgcT}\text{FiberBought}_{jgcT} + E$$

where
$\kappa_p$=sum of DACS, router, transponder and mux costs,
$\epsilon$=cost compression factor, $\delta_T$=yearly discount rate,
$\alpha$=equipment cost factor,
$\omega_{r\lambda cT}$=ring cost per circle,
$\phi_{r\lambda cT}$=wavelength cost per circle, and
$\psi_{jgcT}$=fiber cost per circle.

12. The method of claim 10, wherein $$\text{OperatingCost}_T = \text{VendorTechnicalSupportCost}_T + \text{MetroOperationExpense}_T + \text{IntercityOperationExpense}_T + \text{ProvisioningExpense}_T + \text{BusinessExpense}_T.$$

13. The method of claim 12, wherein $$\text{VendorTechnicalSupportCost}_T = \sum_{(r,\lambda)}^{Technology}\sum_{c=1}^{C}(a_{r\lambda cT}\text{RingsUsed}_{r\lambda cT} + b_{r\lambda cT}\text{WavelengthsUsed}_{r\lambda cT})$$

where
$a_{r\lambda cT}$=vendor O&M ring expense per circle and
$b_{r\lambda cT}$=vendor O&M wave expense per circle.

14. The method of claim 12, wherein $$\text{MetroOperationExpense}_T =$$
$$\varsigma \sum_{(r,\lambda)}^{Technology}\sum_{c=1}^{C}(n_{city}\text{WavelengthsUsed}_{r\lambda cT}) + \sum_{p=1}^{P}C_{metro}\text{Demand}_{pT},$$

where
$\varsigma$=long haul ADM maintenance cost per unit,
$n_{city}$=number of cities of type ADM, and
$C_{metro}$=metro equipment maintenance cost.

15. The method of claim 12, wherein $$\text{IntercityOperationExpense}_T = c_{ILA}f_{ring}\sum_{(r,\lambda)}^{Technology}\sum_{c=1}^{C}\xi_c\text{RingsUsed}_{r\lambda cT} +$$

$$(m_{3RT}(1+C_{ops}))^{T-T_0+1}\sum_{(r,\lambda)}^{Technology}\sum_{c=1}^{C}n_{term}\text{WavelengthsUsed}_{r\lambda cT}$$

where
$c_{ILA}$=maintenance cost for ILA,
$f_{ring}$=fiber per ring,
$\xi_c$=circle distance,
$M_{3RT}$=maintenance cost for RRR terminals,
$C_{ops}$=operating cost increment, and
$n_{term}$=sum of number of terminals.

16. The method of claim 12, wherein $$\text{ProvisioningExpense}_T = \sum_{p=1}^{P}(C_{Prov} + C_{cust})\text{NewDemand}_{pT} + n_{CustMainCost}\sum_{p=1}^{P}\text{Demand}_{pT}$$

where
$C_{prov}$=provisioning cost,
$C_{cust}$=cost equivalent per new DS3 for CIM and order entry, and
$n_{CustMainCost}$=sum of customer maintenance costs.

17. The method of claim 12, wherein $$BusinessExpense_T = c_{RevPerc} \sum_{p=1}^{P} (Price_{pT-1} Demand_{pT-1} + Price_{pT} Demand_{pT}),$$

where $C_{RevPerc}$=scaled percentage of revenue expenses.

18. The method of claim 10, wherein $$AccessCost(Demand_{pT}) = \sum_{p=1}^{P} \phi_{pT} Demand_{pT},$$

where $\phi_{pT}$=local access cost per DS3.

19. The method of claim 10, wherein $$TotalRetirementCost_T =$$

$$\sum_{(r,\lambda)}^{Technology} \sum_{c=1}^{C} (c_{Retire} \omega_{r\lambda cT^*} RingsRetired_{r\lambda cT} + (c_{Retire} \varphi_{r\lambda cT^*}, + sq_T)$$

$$WavelengthRetired_{r\lambda cT}) + M \cdot WavelengthRetired_{r\lambda cT}$$

where $C_{Retire}$=retirement cost factor,
$\omega_{r\lambda cT^*}$=ring cost per circle at time available,
$\phi_{r\lambda cT^*}$=wave cost per circle at time available,
s=scaling factor,
$q_T$=provisioning cost factor, and
M is a constant.

20. The method of claim 1, wherein the objective function is $$NPV = TotalRevenue - \sum_{T=1}^{T_{LAST}} d_T TotalCost_T.$$

21. The method of claim 1, wherein said step (f) comprises the steps of:
(i) removing any non-increasing price constraint;
(ii) performing an initial optimization; and
(iii) evaluating a resulting plan.

22. The method of claim 21, wherein said step (f) further comprises the steps of:
(iv) when a price increase is observed for a product, adjusting the price at the point of increase to eliminate the increase; and
(v) performing a subsequent optimization using the adjustment of step (iv) as a further constraint.

23. A computer program product comprising a computer usable medium having computer readable program code means embodied in said medium for causing an application program to execute on a computer that selects an appropriate combination of network components and product prices over a plurality of consecutive time periods to maximize a net present value (NPV) of a cash flow that results from provision of communication services between nodes of a network, said computer readable program code means comprising:

(a) a first computer readable program code means for receiving constraint information regarding demand for products, prices of products, network topology, available technology, costs, and an initial state of the network;

(b) a second computer readable program code means for forming an expression that models revenue received as a result of sales of products at each time period T, wherein the revenue expression is a function of price and demand for each product p at each time period T, wherein the expression is:

$$TotalRevenue = n \sum_{T=1}^{T_{last}} d_T \left( \sum_{p=1}^{P} \gamma (Revenue_{pT}^{Current\ Demand} + Revenue_{pT}^{New\ Demand}) \right)$$

wherein $Revenue_{pT}^{CurrentDemand} = \alpha(Price_{pT-1} + Price_{pT})Demand_{pT-1}$, $Revenue_{pT}^{NewDemand} = \beta(Demand_{pT} - Demand_{pT-1}) Price_{pT}$, where $\alpha$ and $\beta$ are sealing factors, $$Price_{pT}(Demand_{pT}) = \left( \frac{\beta_{pT} A_{pT}}{Demand_{pT}} \right)^{1/\eta_{pT}},$$

where $\beta_{pT}$ is a share growth parameter, $A_{pT} = (Price_{pT} Demand_{pT})$, and $$\eta = -\frac{\frac{\Delta Q}{Q}}{\frac{\Delta P}{P}},$$ where P is price and Q is demand;

(c) a third computer readable program code means for determining traffic capacity for each link at each time period T;

(d) a fourth computer readable program code means for forming an expression that models costs of providing communications services, wherein the cost expression is a function of demand for each product p at each time period T and of the number of rings and wavelengths bought, used, and retired, for each technology, circle, and time period T;

(e) a fifth computer readable program code means for forming an expression that models NPV as an objective function of revenue and costs; and (f) a sixth computer readable program code means for optimizing the objective function.

24. The computer program product of claim 23, further comprising:
(g) a seventh computer readable program code means for using the optimization to determine network components for each link in the communications network, the timing and location of the deployment of the components, the prices of products, and the timing of price changes.

25. The computer program product of claim 23, wherein the constraint information regarding demand for products comprises the following:
(a) non-decreasing demand from any time period to the next, wherein the extent of any demand increase from one time period to the next is capped;
(b) a predetermined level of demand for each link and each product in an initial time period; and
(c) a fixed proportion of total network-wide demand for each link.

26. The computer program product of claim 23, wherein the constraint information regarding prices of products comprises the following:
(a) a non-increasing price for each product for any time period to the next;
(b) a constant price elasticity with respect to price for each product;
(c) a bell-shaped curve for the elasticity of any product over time; and
(d) a predetermined price for each product in an initial time period.

27. The computer program product of claim 23, wherein the constraint information regarding network topology comprises the following:
(a) a fixed set of nodes requiring connectivity; and
(b) a fixed set of links providing the connectivity.

28. The computer program product of claim 23, wherein the constraint information regarding available technology comprises the following:
(a) a predetermined set of possible combinations of data rates and maximum numbers of wavelengths for a fiber, wherein any technology is an element of the predetermined set;
(b) a predetermined set of fiber generations, wherein any fiber belongs to one of the fiber generations.

29. The computer program product of claim 23, wherein the constraint information regarding costs comprises the following:
(a) the prevailing market cost of each network component at each time period T; and
(b) a predetermined fixed cost compression rate.

30. The computer program product of claim 23, wherein the constraint information regarding the initial state of the network comprises the following:
(a) the number of wavelengths bought in an initial time period;
(b) the number of rings bought in the initial time period.

31. The computer program product of claim 23, wherein said fourth computer readable program code means (d) comprises computer readable program code means for determining the network components necessary to provide the determined capacity for each link at each time period T.

32. The computer program product of claim 23, wherein the cost expression is
$\Sigma d_T \text{TotalCost}_T$, where TotalCost$_T$=InvestmentCost$_T$+OperatingCost$_T$+AccessCost$_T$+TotalRetirementCost$_T$, and $$d_T = \left(\frac{1}{1+r}\right)^{T-T_0},$$

a present value factor where r is an average inflation rate.

33. The computer program product of claim 32, wherein $$\text{InvestmentCost}_T(newDemand_{pT}, RingsBought_{r\lambda cT},$$
$$WavelenghtBought_{r\lambda cT}, FiberBought_{jgcT}) =$$
$$\frac{1}{2}\sum_{p=1}^{P}(K_p(1-\epsilon))^{T-T_{OPER}} NewDemand_{pT} + \frac{1+\alpha}{\sqrt{\delta_T}}$$
$$\sum_{(r,\lambda)}^{Technology}\sum_{c=1}^{C}(\omega_{r\lambda cT} RingsBrought_{r\lambda cT} + \varphi_{r\lambda cT} WavelengthBought_{r\lambda cT}) +$$
$$\frac{1}{\sqrt{\delta_T}}\sum_{c=1}^{C}\sum_{j=1}^{CableSize}\sum_{g=1}^{FiberGeneration} \psi_{jgcT} FiberBought_{jgcT} + E$$

where
$\kappa_p$=sum of DACS, router, transponder and mux costs,
$\epsilon$=cost compression factor,
$\delta_T$=yearly discount rate,
$\alpha$=equipment cost factor,
$\omega_{r\lambda cT}$=ring cost per circle,
$\phi_{r\lambda cT}$=wavelength cost per circle, and
$\psi_{jgcT}$=fiber cost per circle.

34. The computer program product of claim 32, wherein OperatingCost$_T$=VendorTechnicalSupportCost$_T$+MetroOperationExpense$_T$+IntercityOperationExpense$_T$+ProvisioningExpense$_T$+BusinessExpense$_T$.

35. The computer program product of claim 34, wherein $$VendorTechnicalSupportCost_T =$$
$$\sum_{(r,\lambda)}^{Technology}\sum_{c=1}^{C}(a_{r\lambda cT} RingsUsed_{r\lambda cT} + b_{r\lambda cT} WavelengthsUsed_{r\lambda cT})$$

where
$a_{r\lambda cT}$=vendor O&M ring expense per circle and
$b_{r\lambda cT}$=vendor O&M wave expense per circle.

36. The computer program product of claim 34, wherein $$MetroOperationExpense_T =$$
$$\zeta \sum_{(r,\lambda)}^{Technology}\sum_{c=1}^{C}(n_{city} WavelengthUsed_{r\lambda cT}) + \sum_{p=1}^{P} C_{metro} Demand_{pT},$$

where
$\zeta$=long haul ADM maintenance cost per unit,
$n_{city}$=number of cities of type ADM, and
$C_{metro}$=metro equipment maintenance cost.

37. The computer program product of claim 34, wherein $$IntercityOperationExpense_T = c_{ILA} f_{ring} \sum_{(r,\lambda)}^{Technology} \sum_{c=1}^{C} \xi_c RingsUsed_{r\lambda cT} +$$

$$(m_{3RT}(1+C_{ops}))^{T-T_0+1} \sum_{(r,\lambda)}^{Technology} \sum_{c=1}^{C} n_{term} WavelengthsUsed_{r\lambda cT}$$

where $c_{ILA}$=maintenance cost for ILA,
$f_{ring}$=fiber per ring,
$\xi_c$=circle distance,
$m_{3RT}$=maintenance cost for RRR terminals,
$C_{ops}$=operating cost increment, and
$\eta_{term}$=sum of number of terminals.

38. The computer program product of claim 34, wherein $$ProvisioningExpense_T = \sum_{p=1}^{P}(C_{Prov}+C_{cust})NewDemand_{pT} + n_{CustMainCost}\sum_{p=1}^{P} Demand_{pT}$$

where $C_{prov}$=provisioning cost,
$C_{cust}$=cost equivalent per new DS3 for CIM and order entry, and
$n_{CustMainCost}$=sum of customer maintenance costs.

39. The computer program product of claim 34, wherein $$BusinessExpense_T = c_{RevPerc}\sum_{p=1}^{P}(Price_{pT-1}Demand_{pT-1} + Price_{pT}Demand_{pT}),$$

where $C_{RevPerc}$=scaled percentage of revenue expenses.

40. The computer program product of claim 32, wherein $$AccessCost(Demand_{pT}) = \sum_{p=1}^{P} \phi_{pT} Demand_{pT},$$

where $\phi_{pT}$=local access cost per DS3.

41. The computer program product of claim 32, wherein $$TotalRetirementCost_T = \sum_{(r,\lambda)}^{Technology} \sum_{c=1}^{C} (c_{Retire}\omega_{r\lambda cT^*} RingsRetired_{r\lambda cT} + (c_{Retire}\varphi_{r\lambda cT^*}, +sq_T)$$

$$WavelengthRetired_{r\lambda cT}) + M \cdot WavelengthRetired_{r\lambda cT}$$

where $C_{Retire}$=retirement cost factor,
$\omega_{r\lambda cT^*}$=ring cost per circle at time available,
$\phi_{r\lambda cT^*}$=wave cost per circle at time available,
s=scaling factor,
$q_T$=provisioning cost factor, and
M is a constant.

42. The computer program product of claim 23, wherein the objective function is $$NPV = TotalRevenue - \sum_{T=1}^{T_{LAST}} d_T TotalCost_T.$$

43. The computer program product of claim 23, wherein said seventh computer readable program code means (g) comprises:
   (i) computer readable program code means for removing any non-increasing price constraint;
   (ii) computer readable program code means for performing an initial optimization; and
   (iii) computer readable program code means for evaluating a resulting plan.

44. The computer program product of claim 43, wherein said seventh computer readable program code means (g) further comprises:
   (iv) computer readable program code means for adjusting the price at the point of increase if a price increase is observed for a product, to eliminate the increase; and
   (v) computer readable program code means for performing a subsequent optimization using the adjustment of computer readable program code means (iv) as a further constraint.

* * * * *